(12) United States Patent
Stephens et al.

(10) Patent No.: US 8,354,132 B2
(45) Date of Patent: *Jan. 15, 2013

(54) LAMINATED LIDSTOCK AND PACKAGE MADE THEREFROM

(75) Inventors: Chad Stephens, Moore, SC (US); David M. Finley, Simpsonville, SC (US); Cindy Price, Wellford, SC (US); Jason Scroggs, Greenville, SC (US); Darrell Lancaster, Woodruff, SC (US)

(73) Assignee: Cryovac, Inc., Duncan, SC (US)

( * ) Notice: Subject to any disclaimer, the term of this patent is extended or adjusted under 35 U.S.C. 154(b) by 619 days.

This patent is subject to a terminal disclaimer.

(21) Appl. No.: 12/156,986

(22) Filed: Jun. 6, 2008

(65) Prior Publication Data

US 2009/0304874 A1 Dec. 10, 2009

(51) Int. Cl.
*B65D 75/62* (2006.01)
*B65D 65/28* (2006.01)

(52) U.S. Cl. ..... 426/122; 426/106; 426/127; 220/359.3; 220/359.4; 220/369; 428/35.7

(58) Field of Classification Search ............... 426/106, 426/118, 122, 127; 220/359.3, 359.4, 269; 428/35.7
See application file for complete search history.

(56) References Cited

U.S. PATENT DOCUMENTS

| | | |
|---|---|---|
| 2,179,663 A | 10/1955 | Meyer-Jagenberg |
| 4,156,493 A | 5/1979 | Julius |
| 4,411,365 A | 10/1983 | Horikawa et al. |
| 4,433,808 A | 2/1984 | Gordon et al. |
| 4,464,154 A | 8/1984 | Ljungcrantz |
| 4,538,396 A | 9/1985 | Nakamura |
| 4,548,852 A | 10/1985 | Mitchell |
| 4,552,269 A | 11/1985 | Chang |
| 4,610,357 A | 9/1986 | Nakamura |
| 4,616,470 A | 10/1986 | Nakamura |
| 4,651,874 A | 3/1987 | Nakamura |
| 4,653,250 A | 3/1987 | Nakamura |
| 4,679,693 A | 7/1987 | Forman |
| 4,723,301 A | 2/1988 | Chang |
| 4,739,879 A | 4/1988 | Nakamura |
| 4,790,436 A | 12/1988 | Nakamura |
| 4,840,270 A | 6/1989 | Caputo et al. |
| 4,848,575 A | 7/1989 | Nakamura et al. |
| 4,946,038 A | 8/1990 | Eaton |
| 5,048,718 A | 9/1991 | Nakamura |
| 5,065,868 A | 11/1991 | Cornelissen et al. |
| 5,076,424 A | 12/1991 | Nakamura |
| 5,105,603 A | 4/1992 | Natterer |

(Continued)

FOREIGN PATENT DOCUMENTS

EP 0 661 154 B1 12/1994

(Continued)

*Primary Examiner* — Drew Becker
*Assistant Examiner* — Luana Z Long
(74) *Attorney, Agent, or Firm* — Mark B. Quatt

(57) ABSTRACT

A laminated lidstock includes a substrate film, a support web; a pressure sensitive adhesive disposed between the substrate and support webs, and covering the substrate film and support web; a product die cut disposed in the substrate film; and an array of opening die cuts disposed in the substrate film; wherein at least one of substrate film and the support web comprises an oxygen barrier, and wherein at least one of the substrate film and the support web carries a registration device. A method of making the lidstock, and a package, are also disclosed.

7 Claims, 18 Drawing Sheets

U.S. PATENT DOCUMENTS

| | | | |
|---|---|---|---|
| 5,161,350 | A | 11/1992 | Nakamura |
| 5,335,478 | A | 8/1994 | Aronsen |
| 5,344,007 | A | 9/1994 | Nakamura et al. |
| 5,346,301 | A | 9/1994 | Scarberry et al. |
| 5,379,897 | A | 1/1995 | Muckenfuhs et al. |
| 5,388,757 | A | 2/1995 | Lorenzen |
| 5,409,116 | A | 4/1995 | Aronsen |
| 5,503,858 | A | 4/1996 | Reskow |
| 5,595,786 | A | 1/1997 | McBride, Jr. et al. |
| 5,664,677 | A | 9/1997 | O'Connor |
| 5,688,394 | A | 11/1997 | McBride, Jr. et al. |
| 5,741,075 | A | 4/1998 | Collins et al. |
| 5,855,435 | A | 1/1999 | Chiesa |
| 5,873,483 | A | 2/1999 | Görtz et al. |
| 5,908,246 | A | 6/1999 | Arimura et al. |
| 5,938,013 | A | 8/1999 | Palumbo et al. |
| 5,945,145 | A | 8/1999 | Narsutis et al. |
| 6,015,045 | A | 1/2000 | Joseph et al. |
| 6,026,953 | A | 2/2000 | Nakamura et al. |
| 6,056,141 | A | 5/2000 | Navarini et al. |
| 6,065,591 | A | 5/2000 | Dill et al. |
| 6,076,969 | A | 6/2000 | Jaisle et al. |
| 6,113,271 | A | 9/2000 | Scott et al. |
| 6,164,441 | A | 12/2000 | Guy et al. |
| D447,054 | S | 8/2001 | Hill |
| 6,273,610 | B1 | 8/2001 | Koyama et al. |
| 6,309,105 | B1 | 10/2001 | Palumbo |
| 6,375,067 | B1 | 4/2002 | Moriyama |
| 6,428,867 | B1 | 8/2002 | Scott et al. |
| 6,450,685 | B1 | 9/2002 | Scott |
| 6,486,401 | B1 | 11/2002 | Warhurst et al. |
| 6,554,134 | B1 | 4/2003 | Guibert |
| 6,589,622 | B1 | 7/2003 | Scott |
| 6,726,054 | B2 | 4/2004 | Fagen et al. |
| 6,918,532 | B2 | 7/2005 | Sierra-Gomez et al. |
| 6,929,141 | B1 | 8/2005 | Minghetti |
| 6,929,400 | B2 | 8/2005 | Razeti et al. |
| 6,974,256 | B2 | 12/2005 | Kinigakis et al. |
| 6,978,889 | B2 | 12/2005 | McBride |
| 7,007,801 | B2 | 3/2006 | Mangold et al. |
| 7,051,877 | B2 | 5/2006 | Lin |
| 7,104,419 | B2 | 9/2006 | Fagen et al. |
| 7,165,887 | B2 | 1/2007 | Strand et al. |
| 2002/0182359 | A1 | 12/2002 | Muir, Jr. et al. |
| 2003/0183643 | A1 | 10/2003 | Fagen et al. |
| 2003/0230532 | A1 | 12/2003 | Rosenblatt et al. |
| 2004/0180118 | A1* | 9/2004 | Renger et al. ................ 426/106 |
| 2004/0232029 | A1 | 11/2004 | Cotert |
| 2005/0011898 | A1 | 1/2005 | Van Handel et al. |
| 2005/0247764 | A1 | 11/2005 | Sierra-Gomez et al. |
| 2005/0276525 | A1 | 12/2005 | Hebert et al. |
| 2005/0284776 | A1 | 12/2005 | Kobayashi et al. |
| 2006/0018569 | A1 | 1/2006 | Bonenfant |
| 2006/0131311 | A1 | 6/2006 | Wang |
| 2006/0251342 | A1 | 11/2006 | Forman |
| 2007/0023436 | A1 | 2/2007 | Sierra-Gomez et al. |
| 2007/0039951 | A1 | 2/2007 | Cole |
| 2007/0110340 | A1 | 5/2007 | Buchman |
| 2007/0151210 | A1 | 7/2007 | Ausnit |
| 2007/0275133 | A1 | 11/2007 | Sierra-Gomez et al. |
| 2008/0156861 | A1 | 7/2008 | Sierra-Gomez et al. |
| 2008/0240627 | A1 | 10/2008 | Cole et al. |

FOREIGN PATENT DOCUMENTS

| | | |
|---|---|---|
| EP | 0 905 048 A1 | 9/1997 |
| EP | 1 449 789 A1 | 2/2003 |
| EP | 1 886 934 A2 | 8/2007 |
| WO | WO 02/66341 | 8/2002 |
| WO | WO 03/059776 A1 | 7/2003 |
| WO | WO 2005/123535 A1 | 5/2005 |
| WO | 2007/080135 A1 | 7/2007 |

* cited by examiner

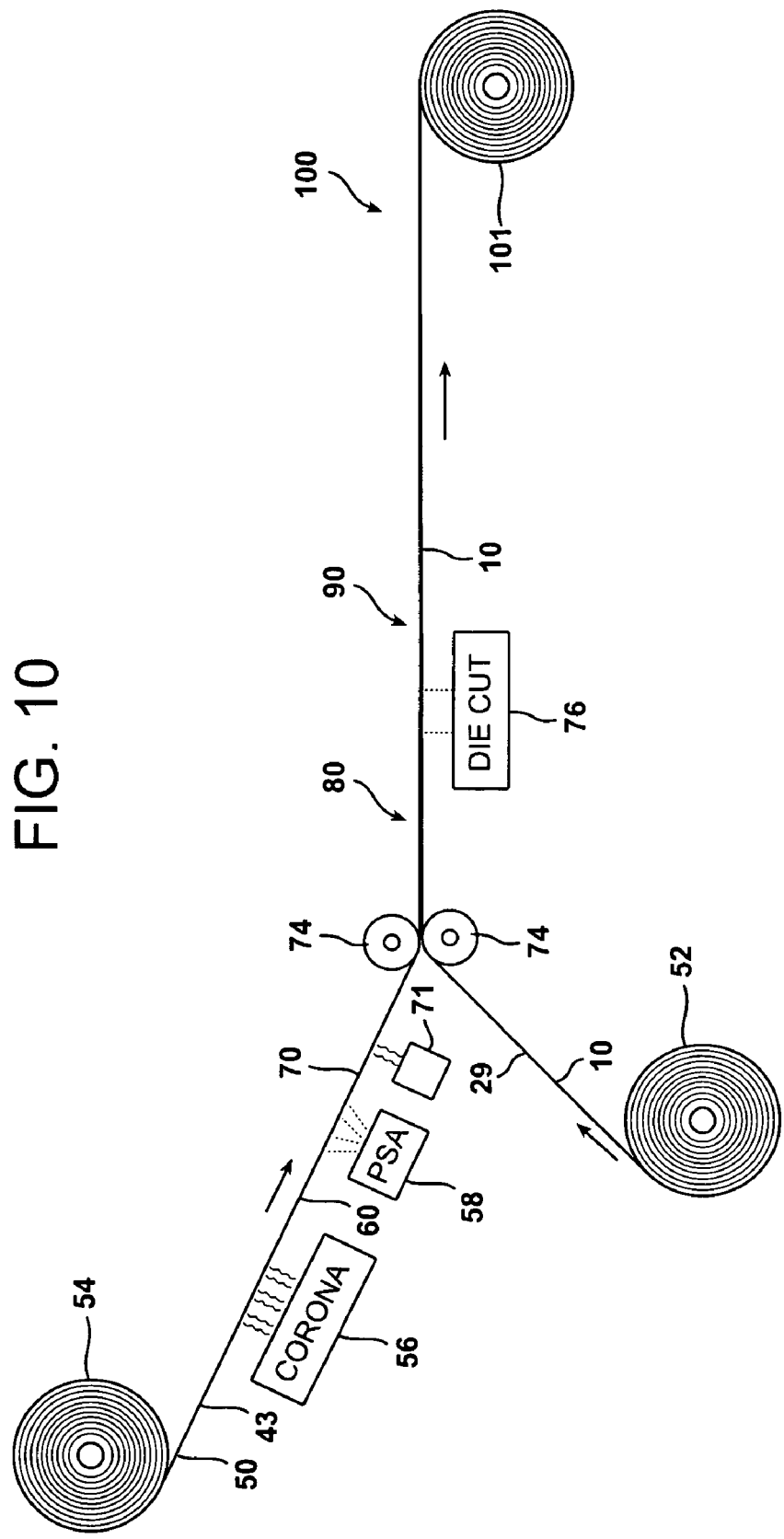

LAMINATED LIDSTOCK AND PACKAGE MADE THEREFROM

FIELD OF THE INVENTION

This invention relates to a laminated lidstock, to a method of making the laminated lidstock, and to a reclosable package made using the laminated lidstock.

BACKGROUND OF THE INVENTION

Food products such as sliced luncheon meats, sliced cheeses and the like have long been packaged in trays having a lidstock cover. The trays can be pre-made trays made from various thermoplastic materials such as foamed polystyrene. Alternatively, trays can be formed from a web of thermoplastic material on the packaging machine at a food processing/packaging facility. The latter makes use of horizontal form/fill/seal equipment (such as thermoforming equipment) available from e.g. Multivac, for converting flat thermoplastic forming web into formed pockets to create trays for containing the food product. In either case, the food product is manually or automatically placed in the tray, a lidstock (also known as a non-forming web) is brought over the top of the filled tray, the filled tray is typically vacuumized or gas flushed, and the lidstock is hermetically sealed to the tray, e.g. by a perimeter heat seal on the tray flange, or a total seal which includes both a perimeter seal and a secondary seal, to finish the package. Opening of the finished package (i.e. opening with the use of tools such as scissors or knives) can provide access to the food product by the consumer. In some instances, a reclosable feature is included to permit the package to be easily reclosed, although typically not in a hermetic manner.

Food packagers often require on their packages, decorative or informational printed labels that carry their trademark or logo, the nature of the food product in the package, and other indicia. This in turn requires either the food packager, or the supplier of the lidstock material, to install discrete printed labels either on individual packages after they are made, or on the lidstock itself in some registered manner that avoids undesirably offset labels. Any of these processes is less than ideal, and adds cost to the production of the package.

There is a need in the marketplace for a packaging arrangement whereby lidstock can be produced by a supplier of lidstock, that can be used in a manner that requires little or no modification to the food packager's packaging equipment, while providing both a manually (i.e. by hand, without the need for tools such as scissors or knives) openable and reclosable feature, and hermeticity of the package when made.

There is a need in the marketplace for a packaging arrangement whereby printed lidstock can be produced by a supplier of lidstock, without the use of discrete labels, and in a manner that requires little or no modification to the food packager's packaging equipment, while also providing both a manually openable/reclosable feature, and hermeticity of the package when made.

There is also a need in the marketplace for a thermoformed, lidded package where the lidstock carries printed indicia, in the absence of a discrete printed label.

The present invention relates to hermetically sealed packages which are manually openable and reclosable and are adapted to package any suitable product, e.g. perishable food products such as sliced food products such as sliced luncheon meat or cheese. The package is manually openable and reclosable, and maintains a hermetic seal until the package is opened, at which time reclosable access is gained to the contents of the package. The lidstock of the package is optionally printed with decorative or Informational print.

SUMMARY OF THE INVENTION

In a first aspect, a laminated lidstock comprises a substrate film comprising an outer laminating layer comprising a thermoplastic material, the outer laminating layer having an outer surface to which a support web can be adhered with a pressure sensitive adhesive; and an inner sealing layer comprising a thermoplastic material, the inner layer having a surface which can be sealed to a tray; a support web having an outer surface and an inner surface, comprising a thermoplastic material selected from polyester, polyamide, and polyolefin; a pressure sensitive adhesive disposed between and adhering the substrate film and the support web, and covering the outer surface of the outer laminating layer of the substrate film, and the inner surface of the support web; a product die cut disposed in the substrate film, but not substantially present in the support web; an array of opening die cuts disposed in the substrate film, but not substantially present in the support web, the array of opening die cuts disposed between the product die cut and a first end of a package made from the laminated lidstock; wherein at least one of the substrate film and the support web carries a registration device.

In a second aspect, a method of making a laminated lidstock comprises providing a substrate film comprising an outer laminating layer comprising a thermoplastic material, the outer laminating layer having an outer surface to which a support web can be adhered with a pressure sensitive adhesive, and an inner sealing layer comprising a thermoplastic material, the inner sealing layer having a surface which can be sealed to a tray;

providing an support web, having an outer surface and an inner surface, comprising a thermoplastic material selected from polyester, polyamide, and polyolefin;

applying a coating of pressure sensitive adhesive to substantially the entire inner surface of the support web;

curing the coating of pressure sensitive adhesive;

bringing the substrate film and the support web together such that the pressure sensitive adhesive is disposed between the substrate film and the support web, covers the outer surface of the substrate film and the inner surface of the support web, and adheres the substrate film and the support web together;

making a product die cut in the substrate film, but not substantially in the support web; and making an array of opening die cuts in the substrate film, but not substantially in the support web, the array of opening die cuts disposed between the product die cut and a first end of a package made from the laminated lidstock.

In a third aspect, a reclosable package comprises a tray comprising a tray bottom, tray sides, and a tray flange, wherein the tray bottom and tray sides define a tray cavity; a food product disposed in the tray cavity; a laminated lidstock, hermetically sealed to the tray flange, comprising a substrate film comprising an outer laminating layer comprising a thermoplastic material, the outer laminating layer having an outer surface to which a support web can be adhered with a pressure sensitive adhesive, and an inner sealing layer comprising a thermoplastic material, the inner sealing layer having a surface which can be sealed to the tray flange; a support web having an outer surface and an inner surface, comprising a thermoplastic material selected from polyester, polyamide, and polyolefin; a pressure sensitive adhesive disposed between and adhering the substrate film and the support web, and covering the outer surface of the outer laminating layer of the substrate film and the inner surface of the support web; a product die cut disposed in the substrate film, but not substantially present in the support web; and an array of opening die cuts disposed in the substrate film, but not substantially present in the support web, the array of opening die cuts disposed between the product die cut and a first end of a package made from the laminated lidstock; and a pull tab disposed at one end or corner of the package; wherein the inner sealant layer of the substrate film is sealed to the tray flange.

BRIEF DESCRIPTION OF THE DRAWINGS

The present invention is illustrated by reference to the following drawings, encompassing different views of various embodiments of the invention, wherein:

FIG. 10 is a schematic flow chart showing a method of making the printed laminate of FIG. 9;

DEFINITIONS

Figure 1:
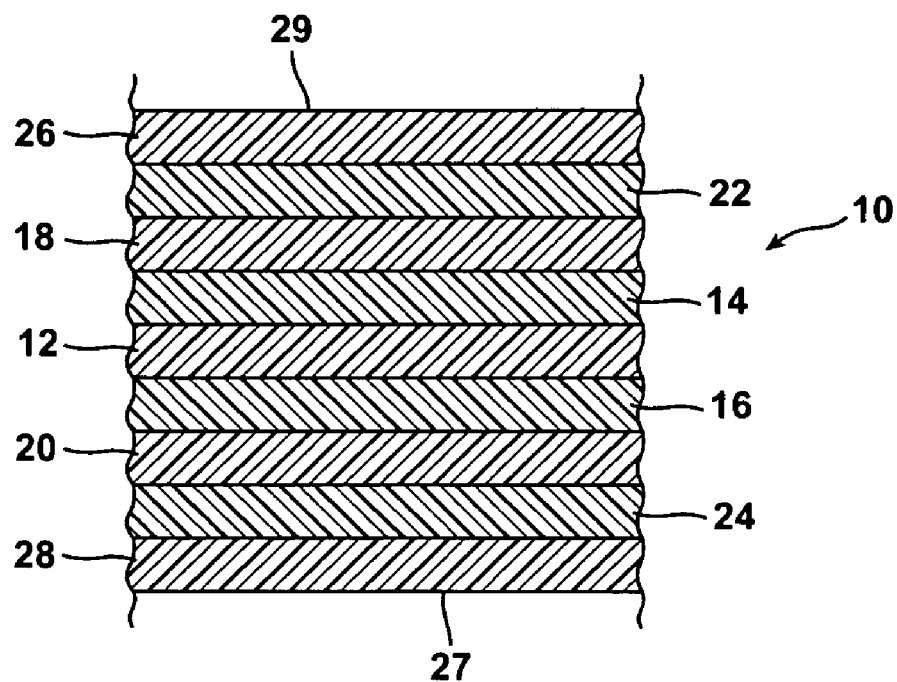
FIG. 1 is a schematic elevational view of a portion of a substrate film in accordance with an embodiment of the invention.

"Die cut" herein refers to any suitable method of cutting or scoring materials, including rotary die, steel rule die, and platen die cutting. For purposes of this application, "die cut" also includes in one embodiment laser cutting or scoring.

"Product die cut" herein refers to a die cut disposed in the substrate film, and of a geometry and location that allows access to product contained in the package of the invention when the package is opened.

"Opening die cut" herein refers to a die cut disposed between the product die cut and an end of a package from which opening is to be initiated. The opening die cut is used in operation of the invention to facilitate peeling of the laminated lidstock, or a portion of the laminated lidstock, away from the tray when opening the package. The opening die cut can be located in a corner of, in two adjacent corners at one end of, or along one end of the laminated lidstock and finished package.

"Array of opening die cuts" herein refers, in one embodiment, to a plurality (two or more) of opening die cuts, wherein in one embodiment the plurality of opening die cuts are parallel to one another. In an alternative embodiment, the array can comprise a single die cut where, in one embodiment, then (1) in a package made from the laminated lidstock, a heat seal is positioned immediately adjacent the single die cut, and (2) the heat seal is located between the product die cut and the single opening die cut. In another embodiment, an "array" comprises a single die cut where, in a package made from the laminated lidstock, a heat seal is superimposed on the single die cut.

"Film" is used herein to mean films, laminates, and webs, either multilayer or monolayer, that may be used in connection with the present invention, for the manufacture of the pouch, cap, or both.

"Ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. EAO includes such heterogeneous materials as linear medium density polyethylene (LMDPE), linear low density polyethylene (LLDPE), and very low and ultra low density polyethylene (VLDPE and ULDPE), such as DOWLEX™ and ATTANE™ resins supplied by Dow, and ESCORENE™ resins supplied by Exxon; as well as linear homogeneous ethylene/alpha olefin copolymers (HEAO) such as TAFMER™ resins supplied by Mitsui Petrochemical Corporation, EXACT™ and EXCEED™ resins supplied by Exxon, long chain branched (HEAO) AFFINITY™ resins and ELITE™ resins supplied by the Dow Chemical Company, ENGAGE™ resins supplied by DuPont Dow Elastomers, and SURPASS™ resins supplied by Nova Chemicals. "EAO" also includes multicomponent ethylene/alpha-olefin interpenetrating network resin (or "IPN resin").

"Ethylene homopolymer or copolymer" herein refers to ethylene homopolymer such as low density polyethylene (LDPE), medium density polyethylene (MDPE), high density polyethylene (HDPE); ethylene/alpha olefin copolymer such as those defined herein; ethylene/vinyl acetate copolymer; ethylene/alkyl acrylate copolymer; ethylene/(meth)acrylic acid copolymer; or ionomer resin.

"Lidstock" herein refers to a film, made at least in part from a thermoplastic multilayer material, that is used to cover a container or tray that carries a product, such as a food product, such as luncheon meat, cheese, or produce. It can be sealed to the tray, typically as a perimeter heat seal. Lidstock typically is supplied to a food processor in a lay flat film rolled onto a roll.

"Olefinic" and the like herein refers to a polymer or copolymer derived at least in part from an olefinic monomer.

"Oxygen barrier" and the like herein refers to materials having an oxygen permeability, of the barrier material, less than 500 $cm^3$ $O_2/m^2$ • day • atmosphere (tested at 1 mil thick and at 25° C., 0% RH according to ASTM D3985), such as less than 100, less than 50, less than 25, less than 10, less than 5, and less than 1 $cm^3$ $O_2/m^2$ • day • atmosphere. Examples of polymeric materials useful as oxygen barrier materials are ethylene/vinyl alcohol copolymer (EVOH), polyvinylidene dichloride (PVDC), vinylidene chloride/methyl acrylate copolymer, vinylidene chloride/vinyl chloride copolymer, polyamide, and polyester. Examples of polymeric materials having an oxygen permeability, of the barrier material, less than 50 $cm^3$ $O_2/m^2$ • day • atmosphere are ethylene/vinyl alcohol copolymer (EVOH), polyvinylidene dichloride (PVDC), vinylidene chloride/methyl acrylate copolymer, and vinylidene chloride/vinyl chloride copolymer. The exact oxygen permeability optimally required for a given application can readily be determined through experimentation by one skilled in the art.

"Polyamide" herein refers to polymers having amide linkages along the molecular chain, and preferably to synthetic polyamides such as nylons.

"Polymer" and the like herein means a homopolymer, but also copolymers thereof, including bispolymers, terpolymers, etc.

"Pressure sensitive adhesive" (PSA) herein refers to an adhesive that bonds firmly with the application of light pressure. It adheres to most surfaces with very slight pressure; are available in solvent and latex or water based forms, and is often based on non-crosslinked rubber adhesives, acrylics, or polyurethanes. PSA forms viscoelastic bonds that are aggressively and permanently tacky; adhere without the need for more than hand pressure; and require no activation by water, solvent, or heat. Some PSA materials are cured by hot air, electron beam, UV, or chemical (peroxide) means. They are available in a wide variety of chemical compositions and systems including acrylic and methacrylate adhesives, rubber-based pressure sensitive adhesives, styrene copolymers (styrene/isoprene/styrene and styrene/butadiene/styrene block copolymers), and silicones. In some embodiments, hot melt adhesives may be useful as well, are included herein for those embodiments as "PSA"; a hot melt adhesive is a thermoplastic adhesive compound, usually solid at room temperature which becomes fluid on heating for use.

"Registration device" herein refers to any mark, pattern, or feature of a film or web, that facilitates the advancement of the film or web, in a controlled manner, into a packaging machine, where the film or web is used as lidstock to make individual packages. The device can be printed in uniformally spaced fashion along or near an edge of the laminated lidstock, i.e. registration marks. Alternatively, in connection with appropriate sensors, the device can be the leading or trailing edge of decorative print, or a die cut, associated with films or webs of the present invention.

"Score", "scoring" or the like herein refers to a type of die cut that does not extend entirely through the relevant layer or film, made e.g. by a laser. Thus, a score by definition leaves intact a certain amount of material in the area of this type of die cut.

"Tray" herein refers to a formed member that has a tray bottom, tray sides, and a tray flange around the upper perimeter of the tray, where the tray bottom and tray sides form an internal cavity or space within which a product such as sliced luncheon meat can be placed, which cavity can be enclosed by a lidstock material sealed to the tray flange. A "filled" tray is one which contains the product, not necessarily one where the entire space inside the cavity is completely taken up with the food product. Trays are typically rigid or semirigid. "Tray" herein also encompasses, in one embodiment, a "flex/flex" package, i.e. one in which a formed web and a non-forming web are flexible. In a flex/flex format, a web of material is formed into a pocket, filled with product, and covered with a lidstock, where the formed pocket is made from a flexible material.

All compositional percentages used herein are presented on a "by weight" basis, unless designated otherwise.

DETAILED DESCRIPTION OF THE INVENTION

EXAMPLES

1. Material

The lidstock laminate for use in accordance with the invention includes (a) a substrate film, and (b) a printed support web. Resins for these films are identified in Table 1.

TABLE 1

| Material Code | Tradename Or Designation | Source(s) |
|---|---|---|
| AD1 | PX3236 ™ | Equistar |
| NY1 | AEGIS ™ H100QP | Honeywell |
| NY2 | GRIVORY ™ G21 | EMS |
| NY3 | ULTRAMID ™ B33LN 01 | BASF |
| OB1 | SOARNOL ™ ET3803 | Nippon Gohsei |
| OB2 | EVAL ™ H171B | EVALCA/Kuraray |
| PE1 | EXCEED ™ 4518P | ExxonMobil |
| PE2 | EXACT ™ 3024 | ExxonMobil |
| SL1 | FSU 255E ™ | A. Schulman |
| SL2 | GRILON ™ MB 3361 FS Natural | EMS |
| SL3 | 1080864S ™ | Clariant |

AD1 is a maleic anhydride grafted linear low density polyethylene that acts as a polymeric adhesive (tie layer material). It has a melt flow rate of 2.0 grams/10 minutes at 190° C./02.16 kg (Condition E), and a density of 0.922 grams/cc.
NY1 is nylon 6 (polycaprolactam).
NY2 is an amorphous copolyamide (6I/6T) derived from hexamethylene diamine, isophthalic acid, and terephthalic acid.
NY3 is nylon 6 (polycaprolactam).
OB1 is an ethylene/vinyl alcohol copolymer (EVOH) with about 38 mole % ethylene.
OB2 is an ethylene/vinyl alcohol copolymer with about 38 mole % ethylene.
PE1 is a single site catalyzed ethylene/hexene copolymer with a density of 0.918 grams/cc, and a melt flow rate of 4.5 grams/10 minutes at 190° C./02.16 kg (Condition E).
PE2 is a single site catalyzed ethylene/1-butene copolymer with a density of .905 grams/cc, and a melt flow rate of 4.5 grams/10 minutes at 190° C./02.16 kg (Condition E).
SL1 is a masterbatch having about 70% low density polyethylene with 25% silica and 5% erucamide, each component by weight of the masterbatch. A very small amount of stabilizer is present.
SL2 is a polyamide 6 based masterbatch containing antiblock and slip materials.
SL3 is a masterbatch having about 70% polyamide 6, 20% diatomaceous earth and 10% erucamide, each component by weight of the masterbatch.

All compositional percentages herein are by weight, unless indicated otherwise.

A. Substrate Film

A representative film structure suitable for use as the substrate film 10 in accordance with the invention is shown in FIG. 1.

In one embodiment, this film has the composition shown in Table 2.

TABLE 2

(Example 1)

| Layer | Composition | Gauge (vol. %) | Gauge (mils) | Gauge (μm) |
|---|---|---|---|---|
| 26 | 96% NY3 + 2% SL2 + 2% SL3 | 13.0 | 0.33 | 8.3 |
| 22 | AD1 | 18.0 | 0.45 | 11.4 |
| 18 | AD1 | 5.0 | 0.13 | 3.2 |
| 14 | 80% NY1 + 20% NY2 | 6.5 | 0.16 | 4.1 |
| 12 | OB1 | 8.0 | 0.20 | 5.1 |
| 16 | 80% NY1 + 20% NY2 | 6.5 | 0.16 | 4.1 |
| 20 | AD1 | 8.0 | 0.20 | 5.1 |
| 24 | PE1 | 20 | 0.50 | 12.7 |
| 28 | 94% PE2 + 6% SL1 | 15 | 0.38 | 9.5 |

Example 1 as shown has a total thickness of about 2.5 mils.

Core layer 12 of the above film structure can comprise any suitable oxygen barrier material, such as EVOH, and can be blended in any suitable proportion with other polymeric materials or organic or inorganic additives as desired.

In one embodiment, intermediate layers 14 and 16 can each comprise 100% semicrystalline polyamide such as nylon 6.

In another embodiment, intermediate layers 14 and 16 each comprise a blend of an amorphous polyamide and a semicrystalline polyamide. The semicrystalline polyamide can be any suitable polyamide, including nylon 6.

The amorphous polyamide can comprise any suitable percent of the overall polyamide blend, and can comprise e.g. less than 50 wt. %, less than 40 wt %, or less than 30 wt. % of the polyamide blend of layers 14 and 16. The amorphous polyamide can comprise from 5 to 45 wt. %, such as from 20 to 40 wt. %, such as from 25 to 35 wt. % of the polyamide blend of layers 14 and 16. The blend ratios of layers 14 and 16 can be the same, or can differ.

Useful commercially available amorphous polyamides include FE4494™ and FE4495™. These are PA6I/66/69 polyamides available from EMS. Also useful is FE7103™, a PA6I/MXDI polyamide available from EMS. Other amorphous polyamides that can be used are PA66/6T; PA66/6I; PA66I/66T; PA6/6T; and PA6/6I. Also useful is PA6/3/T available from Degussa as TROGAMID™, and PA6I/6T available from DuPont as SELAR™ PA 3426.

The semicrystalline polyamide can comprise any suitable percent of the overall polyamide blend, and can comprise e.g. more than 50 wt. %, more than 60 wt. %, or more than 70 wt. % of the polyamide blend of layers 14 and 16. The semicrystalline polyamide can comprise from 55 to 95 wt. %, from 60 to 80 wt. %, or from 65 to 75 wt. % of the polyamide blend of layers 14 and 16.

Tie layers 18 and 20 can comprise any suitable polymeric adhesive that functions to bond two layers together. Materials that can be used in embodiments of the present invention include e.g. ethylene/vinyl acetate copolymer; anhydride grafted ethylene/vinyl acetate copolymer; anhydride grafted ethylene/alpha olefin copolymer; anhydride grafted polypropylene; anhydride grafted low density polyethylene; ethylene/methyl acrylate copolymer; and anhydride grafted ethylene/methyl acrylate copolymer. Tie layers 18 and 20 can be the same, or can differ. The choice of tie layers depends at least in part on the choice of polymer for the other layers of the film.

Bulk layers 22 and 24 can comprises a suitable polyolefin, such as an ethylene/alpha-olefin copolymer; and/or a polymeric adhesive such as those disclosed herein for tie layers 18 and 20. Bulk layers 22 and 24 can be the same, or can differ.

Outer layer 26 functions as an outer laminating layer of the film, and provide a surface 29 to which the printed support web 50 (see FIG. 4) can be laminated by means of a pressure sensitive adhesive (PSA). This layer can comprise one or more of polyamide, polyester, any of various polyolefin copolymers including ethylene polymer or copolymer, ethylene/alpha olefin copolymer, ethylene/vinyl acetate copolymer, ionomer resin, ethylene/acrylic or methacrylic acid copolymer, ethylene/acrylate or methacrylate copolymer, low density polyethylene, high density polyethylene, propylene homopolymer, propylene/ethylene copolymer, or blends of any of these materials. Alternatively, a UV-cured or curable overprint varnish on e.g. an olefinic base can function as surface 29 of outer layer 26.

Inner layer 28 functions as a sealant layer of the film, and provide a surface 27 to which a product support such as a tray can be sealed, e.g. by heat sealing. Layer 28 comprises one or more olefinic polymers. Polymers that may be used for the inner layer include various polyolefin copolymers including ethylene polymer or copolymer, ethylene/alpha olefin copolymer, ethylene/vinyl acetate copolymer, ionomer resin, ethylene/acrylic or methacrylic acid copolymer, ethylene/acrylate or methacrylate copolymer, low density polyethylene, high density polyethylene, propylene homopolymer, propylene/ethylene copolymer, or blends of any of these materials.

Additional materials that can optionally be incorporated into one or more of the film layers, as appropriate, include antiblock agents, slip agents, antifog agents, fillers, pigments, dyestuffs, antioxidants, stabilizers, processing aids, plasticizers, fire retardants, UV absorbers, etc.

In general, the substrate film 10 can have any total thickness desired, and each layer can have any thickness desired, so long as the film provides the desired properties for the particular packaging application in which the film is used. Typical total film thicknesses are from 0.5 mils to 15 mils, such as 1 mil to 12 mils, such as 2 mils to 10 mils, 3 mils to 8 mils, and 4 mils to 6 mils. Suitable gauges include 2.5 mils (as in Example 1); 3.0, 3.5, 4.0, 4.5, 5.0, 6.0, 7.0, 8.0, and 9.0 mils. In one embodiment, layer gauges can be proportionately the same as shown in Example 1. By way of example, a substrate film 10 with a total thickness of 5.0 mils can have a layer 26 with a thickness of 0.76 mils, a layer 22 with a thickness of 1.0 mils, etc.

Alternatively, the various layers can have any suitable thickness.

Figure 2:
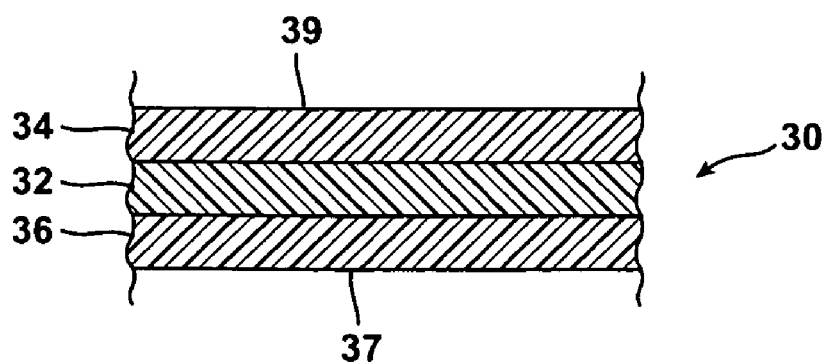
FIG. 2 is a schematic elevational view of a portion of a substrate film in accordance with an alternative embodiment of the invention.

Substrate film 10 can have any suitable number of layers, as long as a sealant layer is present, to provide a layer sealable to a product support member; and an outer layer is present that functions as a surface to which the printed support web 50 (see FIG. 4) can be laminated by means of a pressure sensitive adhesive (PSA). Thus, by way of example, FIG. 2 shows, in another embodiment, a three layer film 30 having an oxygen barrier layer 32 sandwiched between an outer layer 34, that can function as a laminating layer by providing a surface 39 to which the printed support web 50 (see FIG. 4) can be laminated by means of a pressure sensitive adhesive (PSA), and a sealant layer 36 that provides a surface 37 to which a product support member such as a tray can be sealed, e.g. by heat sealing. Two, three, four, five, six, seven, and eight layer films can alternatively be produced, that each include the essential layers described above with respect to the film of FIG. 2, with additional layers as needed, using suitable polymers such as olefin homopolymers or copolymers.

In another embodiment (see FIG. 2A), the oxygen barrier layer of substrate film 10 is not necessary, provided that the support web (discussed in more detail below) includes a coating or layer that comprises an oxygen barrier having an oxygen permeability, of the barrier material, less than 50 cm$^3$ O$_2$/m$^2$ • day • atmosphere (tested at 1 mil thick and at 25° C., 0% RH according to ASTM D3985), e.g. EVOH or saran.

Figure 2A:
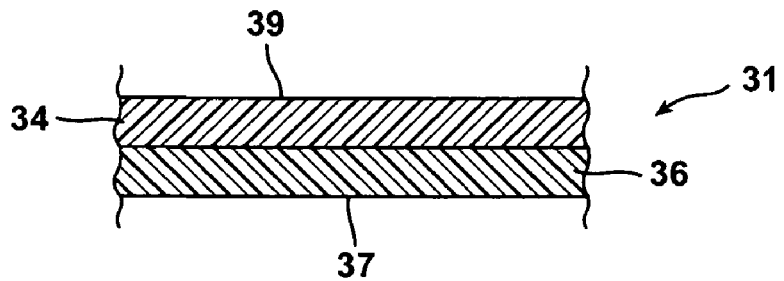
FIG. 2A is a schematic elevational view of a portion of a substrate film in accordance with another embodiment of the invention.

In yet another alternative embodiment, a substrate film 31 as shown in FIG. 2A can be used in combination with a support web that does not have an oxygen barrier having an oxygen permeability, of the barrier material, less than 50 cc/m$^2$/24 hr at 25° C., 0% RH, 1 atm oxygen at a thickness of 1 mil (AS™ D 3985). Such applications include for example laminated lidstocks where a high oxygen barrier is not desirable, e.g. in packaging produce.

In another embodiment, the oxygen barrier layer of support web 40 is not necessary provided the substrate film includes a coating or layer that comprises an oxygen barrier having an oxygen permeability, of the barrier material, less than 50 cc/m$^2$/24 hr at 25° C., 0% RH, 1 atm oxygen at a thickness of 1 mil (ASTM D 3985), e.g. EVOH or saran.

As indicated above, in another embodiment, neither the support web nor the substrate film have an oxygen barrier as described.

2. Method of Making a Laminated Lidstock

With reference to FIG. 10, a method of making a laminated lidstock is shown. The flow of materials is in the direction of the arrows. Those of skill in the art will recognize that the drawings herein, including FIGS. 1 to 9, are not necessarily to scale, and certain features of the invention may be graphically exaggerated for clarity. The method comprises in one embodiment the following steps:

1) providing a substrate film 10 comprising an outer laminating layer comprising a thermoplastic material, the outer laminating layer having an outer surface to which a support web can be adhered with a pressure sensitive adhesive; and an inner sealant layer comprising a thermoplastic material, the inner sealant layer having an inner surface which can be sealed to a tray.

The composition of the substrate film is in one embodiment as described herein, and as shown in FIG. 1. An alternative substrate film is shown in FIG. 2. The substrate film can be made by any suitable process, including coextrusion, extrusion coating, extrusion lamination, and conventional lamination using polyurethane or other adhesives. These manufacturing processes are well known in the art. Extrusion can be done in annular or flat dies. The extrudate can be hot blown or cast, and optionally solid-state oriented as desired. Chemical or electronic crosslinking of one or more layers of the webs can be done. As shown in FIG. 10, substrate film 10 is advanced by suitable motive means (not shown, and well known in the art, such as a motor) from roll 52.

Figure 3:
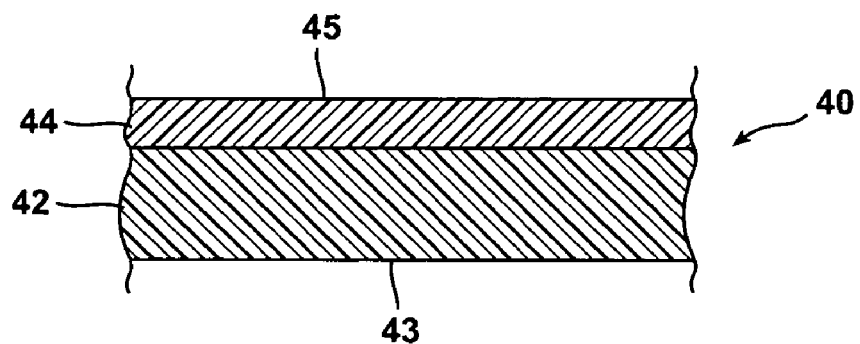
FIG. 3 is a schematic elevational view of a portion of a support web in accordance with an embodiment of the invention.

2) providing a support web 40, having an outer surface and an inner surface, comprising a thermoplastic material selected from polyester such as biaxially oriented polyethylene terephthalate, polyamide such as biaxially oriented polyamide, and polyolefin such as biaxially oriented polypropylene. The composition of the support web is in one embodiment as described herein, and as shown in FIG. 3. The support web can be made by any suitable process. Optionally, a saran or other oxygen barrier material 44 is applied as e.g. a coat onto a surface of support layer 42.

Figure 4:
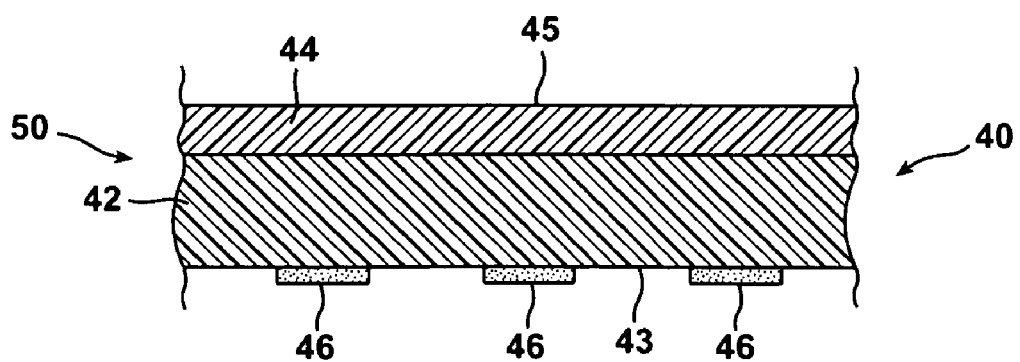
FIG. 4 is a schematic elevational view of the support web of FIG. 3, but also including an optional reverse print feature on a first surface of the support web.

3) optionally, printing indicia on at least one of a) the outer surface 29 of the outer laminating layer 26 of the substrate film 10, and b) the inner surface 43 of the support layer 42 of the support web 40. With reference to FIGS. 4 and 10, support web 50 is shown as the support web 40 of FIG. 3, but with printed indicia 46 on one surface of the film. As shown in FIG. 10, support web 50 is advanced by suitable motive means (not shown, and well known in the art, such as a motor) from roll 54. The printed indicia can be of any suitable type or pattern, or ink composition, such as the types disclosed herein. Any suitable printing technique can be used, such as rotary screen, gravure, or flexographic techniques. Inks and processes for printing on plastic films are known to those of skill in the art. See, for example, Leach & Pierce, The Printing Ink Manual, (5th ed., Kluwer Academic Publishers, 1993), which is incorporated herein in its entirety by reference.

In the art of flexographic printing, and in particular the use of an impression cylinder, a web passes between a printing cylinder and an impression cylinder. The impression cylinder is typically a smooth metal cylinder, and it supports the web against the printing cylinder. The printing cylinder is also typically a smooth metal cylinder, and carries one or more rubber or elastomeric printing plates. These plates pick up rapid drying fluid ink from an anilox (ink metering) roll, and deposit it on surface of the web in contact with the printing cylinder. The anilox roll in turn transfers ink from a fountain roll, or an open or closed doctor blade system, in communication with a source of ink. Flexographic techniques are discussed in Flexography Principles and Practices, second edition, copyright 1970, published by the Flexographic Technical Association, Inc.; and Flexographic Printing, copyright 1958, published by F. E. Boughton. The film to be printed is often corona treated before printing. This is conventional practice, and is not to be confused with the corona treatment disclosed herein in association with the application of pressure sensitive adhesive in accordance with the invention.

The printed indicia can be disposed on either a) the outer surface (29 or 39) of the outer laminating layer (26 or 34) of the substrate film, b) the inner surface (43, see FIG. 3) of the support web 42 of the support web 40, or c) both. Those of skill in the art will make such a choice based e.g. on the economics of each approach, and technically on the ability to produce a satisfactory printed surface on the materials chosen for layers 26 (FIG. 1) or 34 (FIG. 2) on the one hand, and 42 (FIG. 3) on the other hand, keeping in mind the effects of film movement and advancement during the processing of these films in accordance with the invention, and the possible effect on a printed surface.

PET, with a melting point of about 260° C., and a relatively high Young's modulus of between about 600,000 and 900,000 psi, is useful as a material to be coated with a pressure sensitive adhesive (particularly where a hot drying technique is used for curing the adhesive) and for printing with a registered print pattern. Other materials with a Young's modulus of between about 600,000 and 900,000 psi can alternatively be used. Thus, FIGS. 4 and 10 are shown with the printed indicia 46 as a reverse print on the inner surface (43, see FIG. 4) of the support layer 42 of the support web 50. As shown in FIG. 10, support web 50 is advanced by suitable motive means (not shown, and well known in the art, such as a motor) from roll 54. The support web 40 could be printed in-line along with the remaining steps disclosed herein. Alternatively, and as shown in FIG. 10, support web 40 has been pre-printed to produce a printed support web 50.

In any of these embodiments, the printed indicia 46 are ultimately disposed between the substrate film and the support web in a trapped fashion, so that the printed indicia is not exposed to an exterior surface of the ultimate package. Nevertheless, additional printed indicia or labels could be added to the exterior of the finished package, and/or additionally printed on the outer surface 45 of coating or layer 44 of the support web (see FIGS. 3 and 4) if so desired, without departing from the invention.

The printed indicia can be decorative or informational in nature, supplying the same kinds of information, or the same decorative graphics, as currently supplied by conventional discrete labels. Decorative printed indicia can include a logo, a trademark, product information, etc. with text and/or graphics. Decorative and informational printed indicia are optional to the present invention.

Printed indicia can be in the form of registration marks. These are printed in uniformally spaced fashion along or near an edge of the laminated lidstock. These can be printed either as a surface print on the outer surface 29 or 39 of the substrate film 10 or 30; on the inner surface of support web 40; or on one of the outside surfaces of laminated lidstock 100. Registration marks facilitate the use of the laminated lidstock in thermoform packaging systems.

4) optionally, corona treating the inner surface of the support web. A conventional corona treater 56 is shown schematically in FIG. 10 as treating the inner surface (43, see FIG. 4) of the support layer 42 of the support web 50, to produce a support web 60 that is now both reverse printed, and has a corona treated surface 57 (see FIG. 5), in preparation for the application of a pressure sensitive adhesive to the treated surface.

Figure 5:
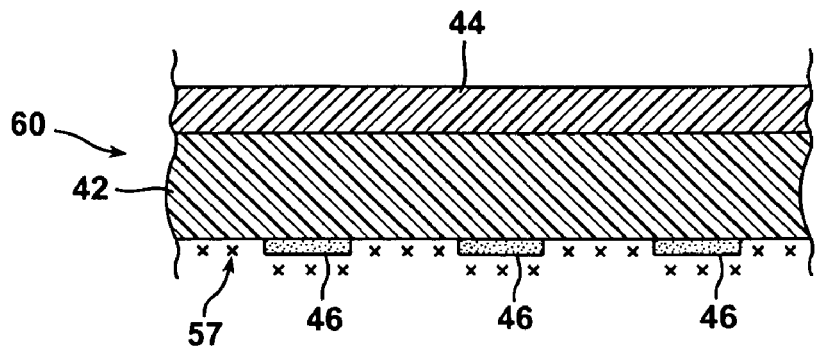
FIG. 5 is a schematic elevational view of the printed support web of FIG. 4, but also including a corona treated surface on the printed first surface of the support web.
Figure 6:
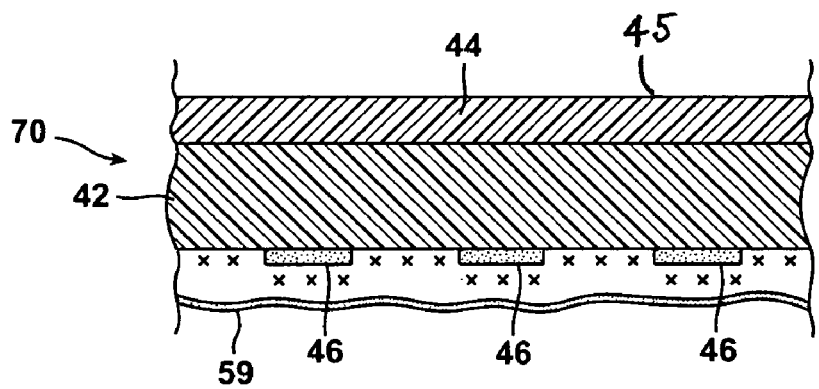
FIG. 6 is a schematic elevational view of the corona treated, printed support web of FIG. 5, but also including a coating of a pressure sensitive adhesive on the corona treated, printed first surface of the support web.
Figure 7:
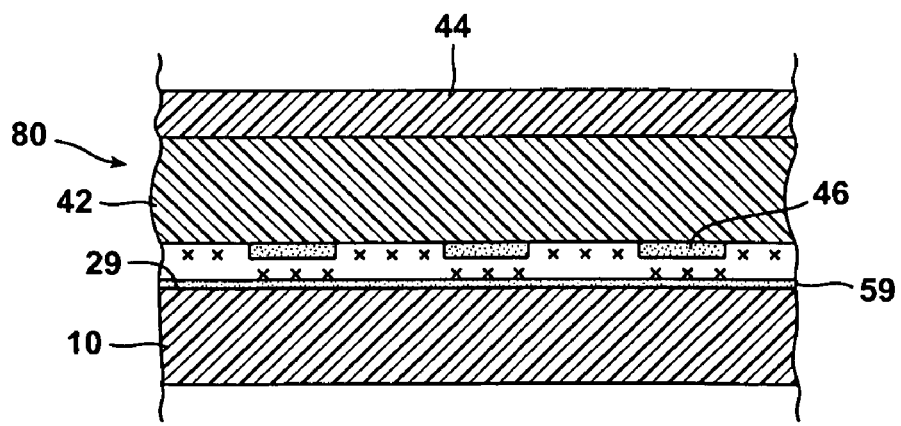
FIG. 7 is a schematic elevational view of a portion of a printed laminate resulting from the adhesion of the substrate film of FIG. 1 to the corona treated, printed support web of FIG. 6.

Typical PSA materials adhere well to PET. Also, PET has relatively high surface energy, so that relatively lower levels of corona treating as used herein is needed. In one embodiment, therefore, the inner surface 43 of a PET support web is corona treated and thereafter coated with a pressure sensitive adhesive. Thus, FIGS. 5 and 10 are shown with the corona treated surface 57 as the inner surface (43, see FIG. 4) of the support layer 42 of the support web 60.

The nature of the substrate film described in Example 1 is such, with respect to its adhesiveness to pressure sensitive adhesive, that in one embodiment the inner surface 43 of the support web is corona treated and then coated with a pressure sensitive adhesive.

Those of skill in the art will recognize, after a review of this disclosure, that as an alternative to corona treating the inner surface of the support web (in preparation for applying a pressure sensitive adhesive to the corona treated surface), a silicon-coated transfer paper can be coated with a pressure sensitive adhesive, and then the pressure sensitive adhesive can be transferred to the outer laminating layer (26 or 34) of the substrate film.

The pressure sensitive adhesive will typically adhere to the support web and the substrate film without corona treatment. However, in this embodiment, depending on the materials chosen for each, the pressure sensitive adhesive may, upon opening of a package in accordance with the invention, exhibit alternating adhesive failure, i.e. some of the pressure sensitive adhesive may adhere to the support web, and some may adhere to the substrate film. Depending upon the commercial end-use application and style of package, having an appreciable amount of pressure sensitive adhesive left on the substrate film, upon opening of the package, may or may not be acceptable to the package producer or end use customer.

5) applying a coating of a pressure sensitive adhesive 59 to substantially the entire inner surface of support web 60 to produce an support web 70 that has been reverse printed, and coated with a pressure sensitive adhesive. A conventional pressure sensitive adhesive applicator 58 is shown schematically in FIG. 10 as applying pressure sensitive adhesive to the inner now corona treated surface 57 (see FIG. 5) of the support layer 42 of the support web 60, to produce an support web 70 that is now reverse printed, corona treated, and coated with a pressure sensitive adhesive on the inner surface. The pressure sensitive adhesive can be of any suitable composition and thickness, as disclosed herein. In one embodiment, the PSA is an emulsion based acrylic adhesive. The thickness of the coating of pressure sensitive adhesive may vary from one portion of the coated surface to another. This is acceptable as long as the finished package functions in its intended way with respect to its manually openable and reclosable features.

6) curing the coating of pressure sensitive adhesive. Curing can be accomplished by any suitable and known means, including hot air drying by a conventional hot air dryer 71.

7) bringing the substrate film 10, and the support web 70 together, e.g. through nip rolls 74 or other suitable means, such that the pressure sensitive adhesive is disposed between the substrate film 10 and the support web 70, and adheres the substrate film 10 and the support web 70 together. The result is a laminated lidstock 80 (see FIG. 7). The nip rolls 74 firmly grip the substrate film and the support web together, with the PSA therebetween, to form the laminated lidstock 80.

8) making a product die cut in the substrate film, but not substantially in the support web. A conventional die cutter 76 can be used to create a product die cut 92. The product die cut 92 is made to define the portion of the substrate film that will ultimately form a flap, that can be pulled back from the remainder of the substrate film, when the package is opened, to provide access to the food contents of the package. This is described in more detail below. The result is a laminated lidstock 90 (see FIG. 8) having product die cut 92.

Figure 8:
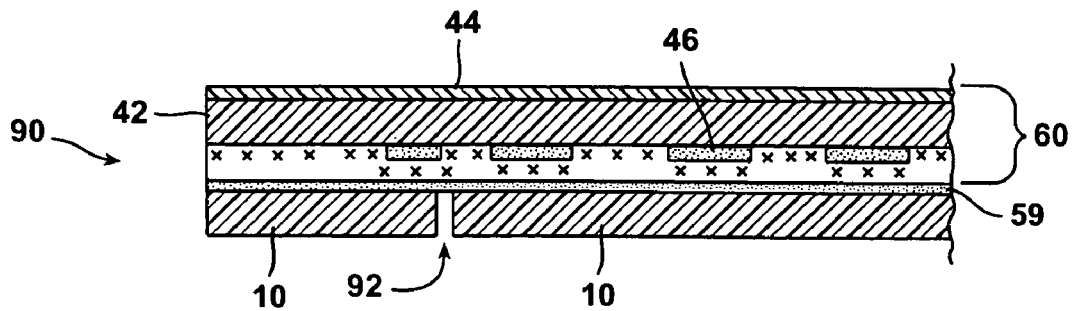
FIG. 8 is a schematic elevational view of an end portion of the printed laminate of FIG. 7, with a product die cut extending through the substrate film of FIG. 7.

Referring to FIG. 8, it will be noted that the die cut 92 extends through the substrate film 10, but is not substantially present in the support web. In practice, the die cut may sometimes extend to a small extent into the support web as well, but this is incidental, and does not affect the functionality of the invention, as long as the support web remains substantially unaffected by the die cut.

Die cuts can be made by any suitable conventional process and equipment, such as using rotary engraved dies, steel rule dies supported in platens as used in reciprocating presses, or commercially available laser cutting or scoring equipment.

Figure 12:
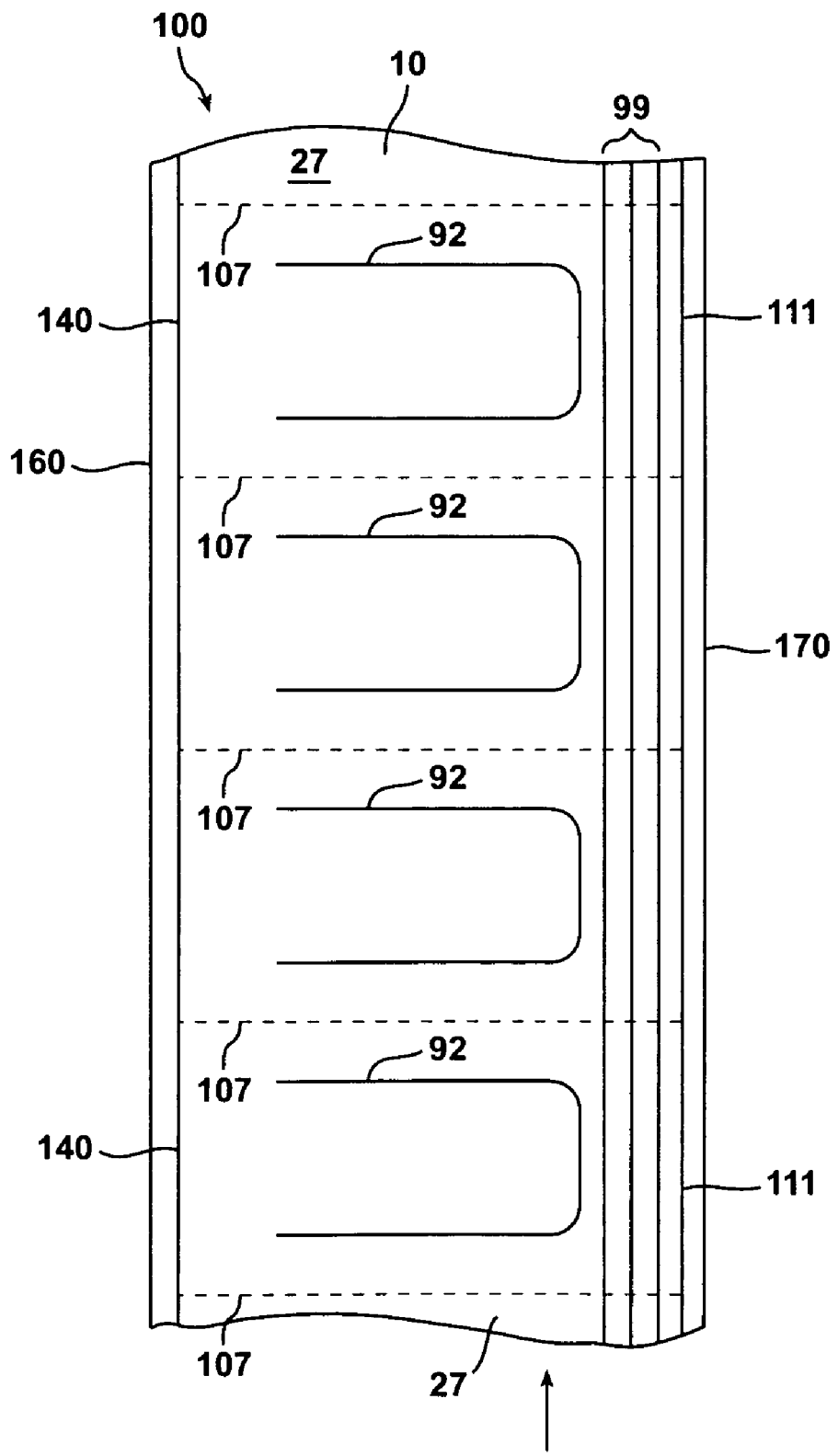
FIG. 12 is a schematic bottom plan view of the printed laminate of FIG. 9.

The pattern of the product die cut 92 is in one embodiment U-shaped, as show in plan view in FIG. 12. Any suitable pattern of product die cut can be used, as long as it serves the function of providing a manually openable/reclosable package in which the packaged product can be accessed by means of a flap created by the product die cut. Alternative Thus, in various embodiments of the invention, both the substrate film and support web can include an oxygen barrier material, as a layer or coating, having an oxygen permeability, of the barrier material, less than 50 cc/m$^2$/24 hr at 25° C., 0% RH, 1 atm oxygen at a thickness of 1 mil (ASTM D 3985), such as EVOH or saran; alternatively, only one of the substrate film and support web can include such an oxygen barrier; and for some applications, like the packaging of produce, neither of the substrate film and support web include such an oxygen barrier.

B. Support Web

Referring to FIG. 3, in one embodiment, a support web 40 is provided by applying a saran (polyvinylidene chloride (PVDC), vinylidene chloride/methyl acrylate copolymer, or vinylidene chloride/vinyl chloride copolymer) coating 44 to a support layer 42 such as polyester such as biaxially oriented PET (BOPET), polyamide such as biaxially oriented polyamide (BOPA), or polyolefin such as biaxially oriented polypropylene (BOPP). These materials are typically prepared by vendors and supplied to film converters. A commercial example of such film is MYLAR™ 34 from DuPont. This film is a monolayer PET film coated on one surface with saran. The support web 40 can be of any suitable thickness, including from 0.5 mils to 3 mils, such as 1.5 to 2 mils.

In embodiments where a saran or other oxygen barrier is used In the support web, it is advantageous to apply the saran to the outer surface 45 of the support web 40, rather than the inner surface 43 of the support web 40. This is so that when the product die cut (discussed in more detail below) is made, the oxygen barrier properties of the overall laminated lidstock will not be compromised if the product die cut extends not only through the substrate film 10, but also partially into the support web 40. patterns include triangular, three side rectangle, hour glass, and other shapes.

Referring to FIG. 8, it will be noted that in one embodiment the product die cut 92 substantially extends through the substrate film 10, but is not substantially present in the support web 60. In practice, the cut may sometimes extend through most of, but not entirely through, the thickness of the substrate film. The die cut in this embodiment is thus in the nature of a score rather than a complete cut. Thus, in various embodiments the cut 92 extends through at least 50% of the thickness of substrate film 10, e.g. at least 60%, at least 70%, at least 80%, at least 90%, at least 95%, or 100% of the thickness of the substrate film.

In practice, the PSA layer 59 will typically also be breached or cut by the product die cut 92, although for the sake of clarity this is not shown in the drawings.

10) making an array 99 of opening die cuts 102 in the substrate film, but not substantially in the support web.

The array 99 can be made using any suitable process and equipment, including a mechanical cutting system using rotary engraved dies, or steel rule dies supported in platens as used in reciprocating presses, or laser cutting or scoring. Generally, for both the product die cut 92 and the array 99 of opening die cuts 102, the choice of die cutting technique depends on several factors, including the thickness and physical nature of the film or web to be cut.

Figure 9:
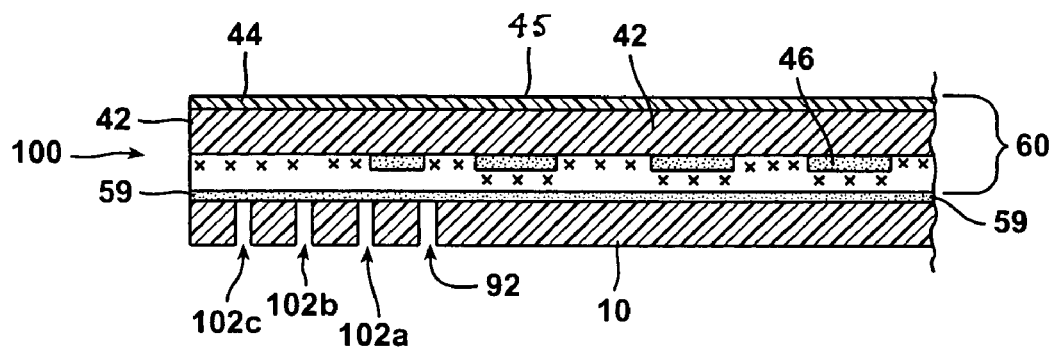
FIG. 9 is a schematic elevational view of the printed laminate of FIG. 8, with an array of opening die cuts substantially extending through the substrate film portion of FIG. 8.

Referring to FIG. 9, it will be noted that in one embodiment the array 99 of opening die cuts 102 can, like product die cut 92, extend to a small extent into the support web, and extend entirely or partially through the substrate film, e.g. through at least 50%, at least 60%, at least 70%, at least 80%, at least 90%, at least 95%, or 100% of the thickness of the substrate film.

The laminated lidstock 100 can be advanced onto a roll 101, to be used by e.g. a food packager as lidstock, or sent to storage or further processed.

The steps of this process can be carried out by otherwise conventional equipment familiar to those of skill in the art.

Figure 10A:
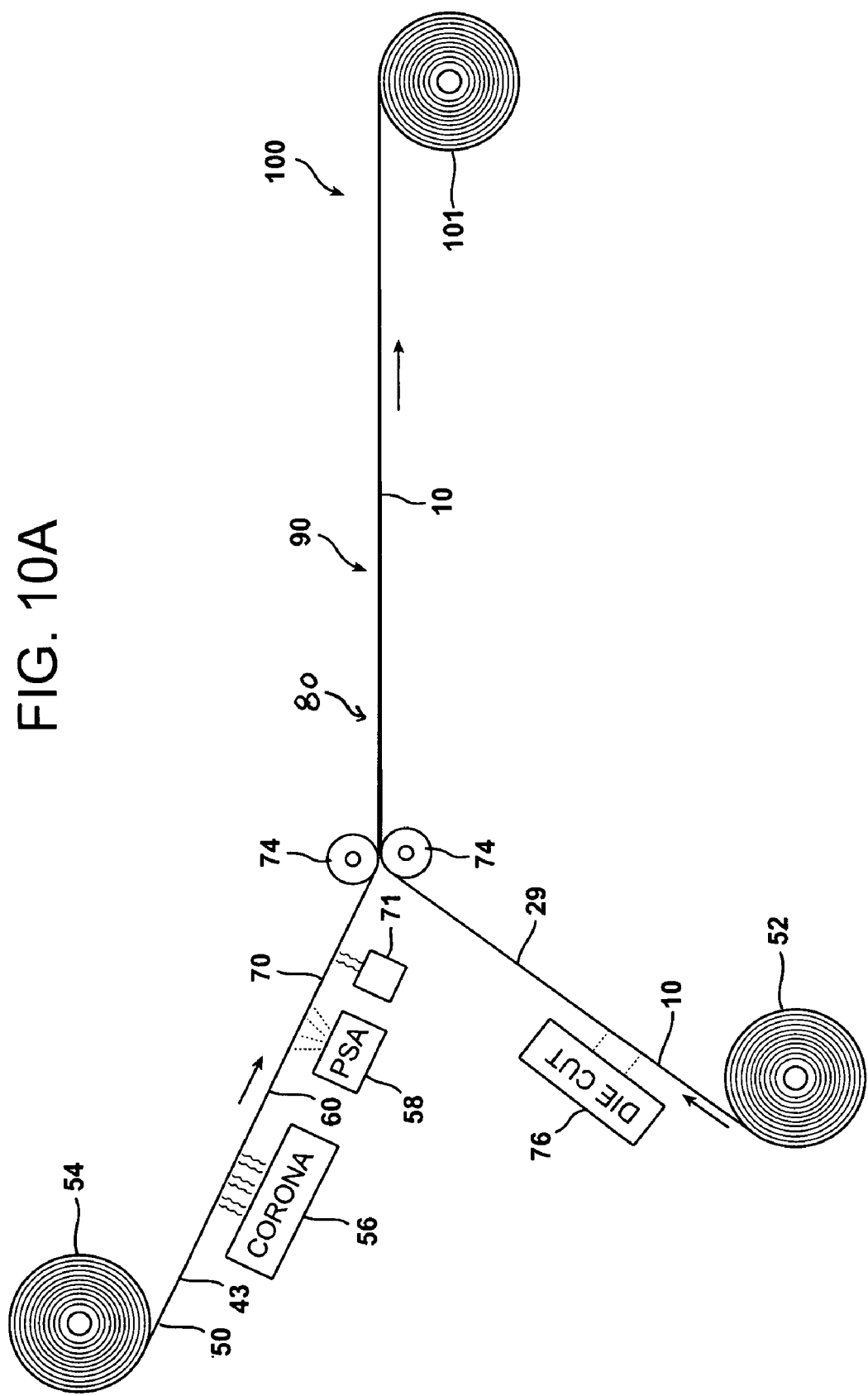
FIG. 10A is a schematic flow chart showing an alternative method of making the printed laminate of FIG. 9.

With reference to FIG. 10A, an alternative method of making a printed laminated lidstock is shown. This method is like that shown in FIG. 10, but the product die cut 92 and the array 99 of opening die cuts 102 are made in the substrate film 10 before the substrate film and the support web are laminated together. In yet another embodiment, and as also shown in FIG. 10A, the die cuts can be initiated from the outer surface 29 of the substrate film, rather from the inner surface 27 as shown in FIG. 10.

The method as described in FIGS. 10 and 10A can be done at a single location, with each of substrate film 10 and support web 40 either made on-site or provided by an outside vendor, and thus prepared elsewhere and provided in advance of the process. The subsequent steps described can be done on a continuous sequential basis, or in discrete steps at different locations at the same site, or by a plurality of operators performing these steps at different locations. Thus, the method as described can be either one continuous process, or a series of distinct processes, as long as the final laminated lidstock 100 is produced using each step in the process.

Laminated lidstock 90 (see FIG. 8) having product die cut 92 is shown in FIGS. 10 and 10A as the lidstock resulting from the die cut step performed at die cutter 76. In one embodiment, the die cut step can be performed in two stages: production of the product die cut 92 to produce laminated lidstock 90, and, downstream or upstream thereof, production of the array 99 of opening die cuts 102 to produce laminated lidstock 100. Alternatively, all the die cuts can be made substantially simultaneously, such that laminated lidstock 90 and 100 are the same.

Referring to FIG. 12, a bottom plan view of the laminated lidstock of FIG. 9 shows product die cuts 92 in each of a registered series in the surface 27 of substrate film 10. Dotted lines 107 indicate the location at which the laminated lidstock 100 will be cut and sealed, e.g. cut and perimeter heat sealed, in registered fashion by otherwise conventional means as discussed herein, e.g. in horizontal form/fill/seal equipment, to create individual packages. Thus, lines 107 represent what will become in one embodiment the side edges of individual packages when the laminated lidstock is fed as lidstock into a packaging system where it is progressively fed over filled trays, sealed to the trays, and cut to create finished packages. Line 140 represents what will become the second end and heat seal of individual packages. Line 111 represents what will become the first end and heat seal of individual packages. The laminated lidstock 100, as it exists when rolled up onto roll 101 (see FIGS. 10 and 10a), and as it feeds into horizontal form/fill/seal equipment in an otherwise conventional packaging operation, will have a second lateral edge 160 and first lateral edge 170. During the cutting and sealing operation to make individual, filled packages, the web will be cut such that the lidstock material between lines 170 and 111, and between lines 160 and 140, will be removed as scrap.

Figure 18:
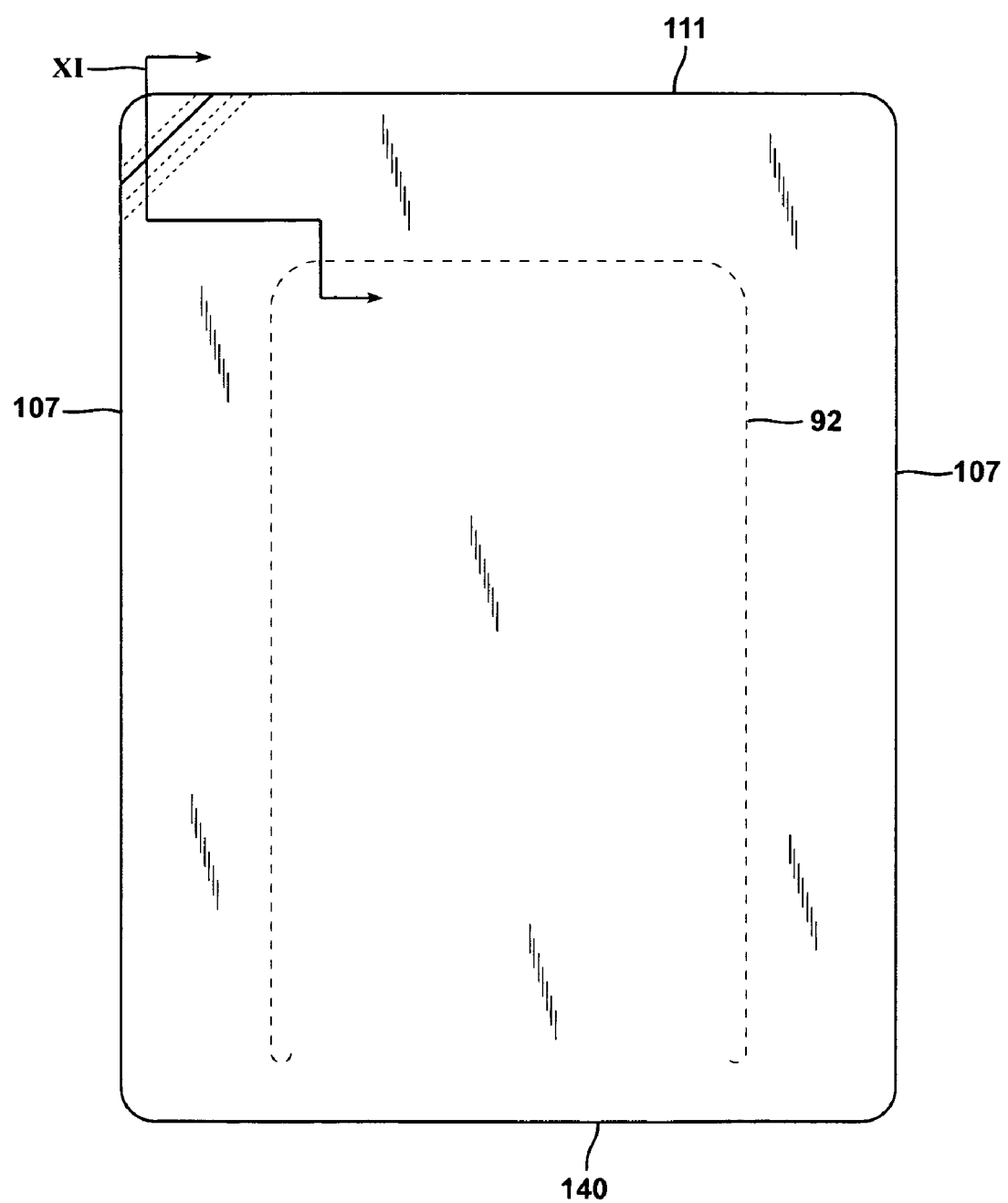
FIG. 18 is a top plan view of the printed laminate of FIG. 9, when sealed to a tray to form a package in accordance with one embodiment of the invention.
Figure 18A:
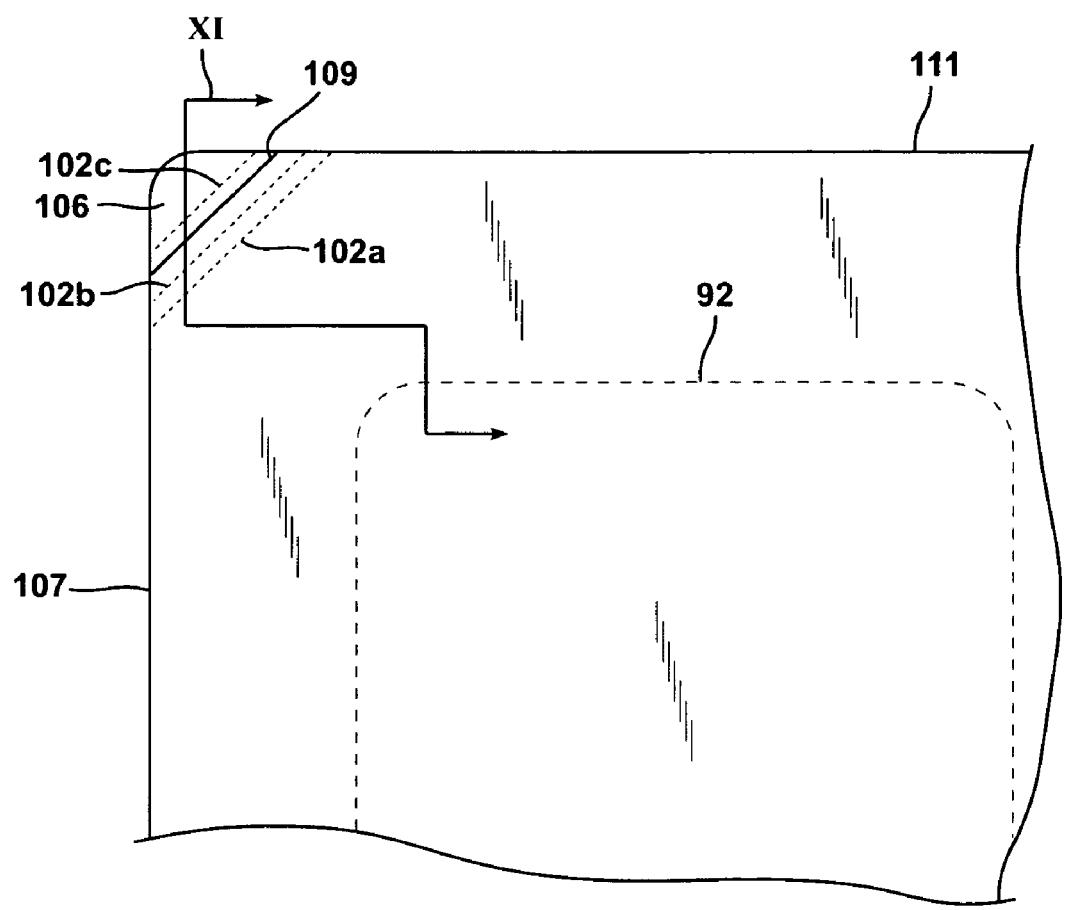
FIG. 18A is an enlarged top plan view of a portion of the printed laminate of FIG. 18.
Figure 19:
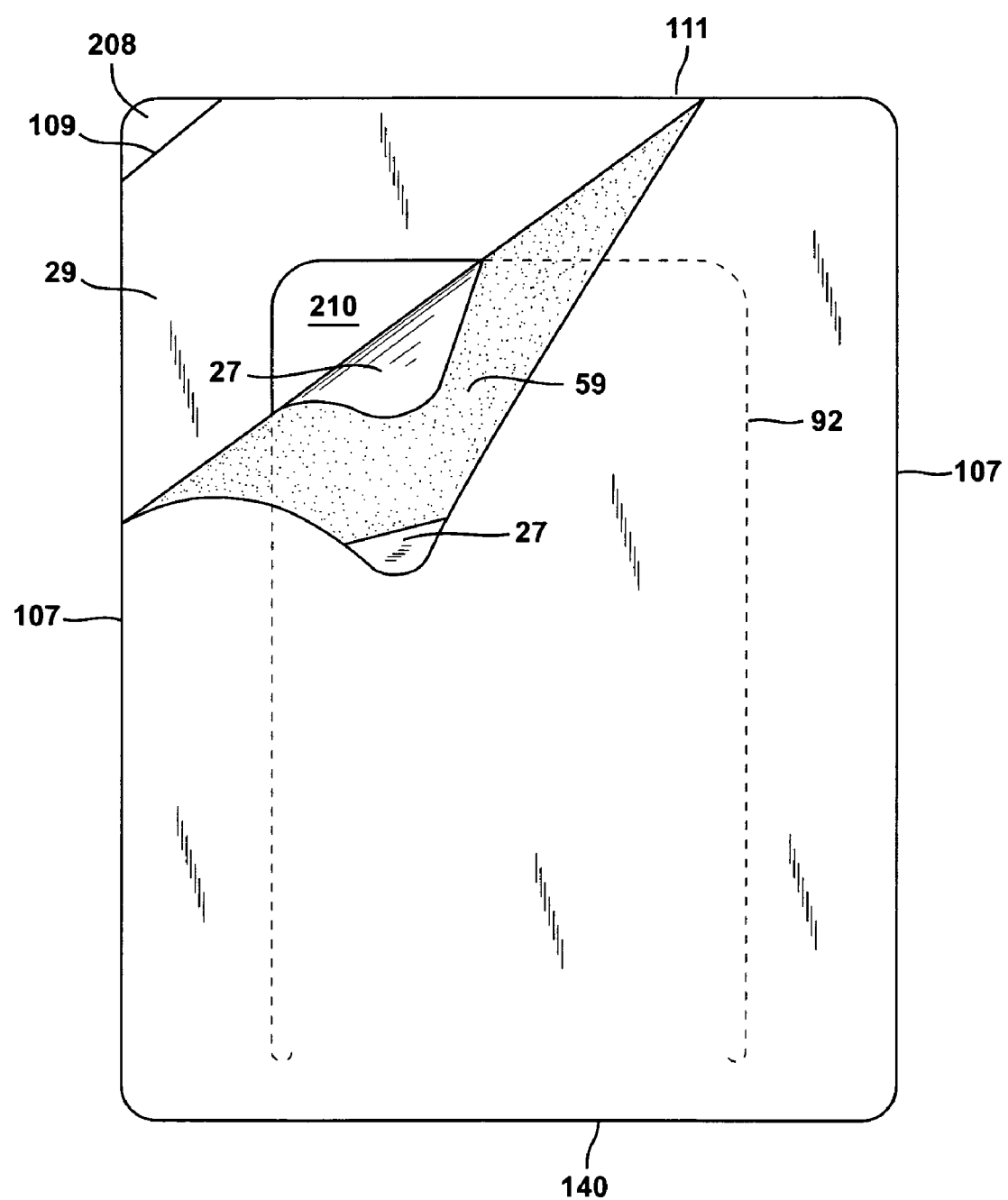
FIG. 19 is a schematic top plan view of the laminated lidstock and package of FIG. 18, showing the package in a partially opened condition.

In one embodiment, where a corner array 99 of opening die cuts 102 is employed, a heat seal segment 109 is installed in the package, amidst or within the array 99, to help seal the laminated lidstock 100 to the tray, and to enable the package to be opened as disclosed herein (see FIGS. 18A and 19).

Any suitable thermoforming machines, such as those available from Multivac, Tiromat, or Rapid Pak, can be used in accordance with the invention for packaging of food products, various industrial and consumer products and sterile medical products. Trays are formed from a lower web by heat and pressure, and can be loaded with product manually or automatically on the machine. After that, the packages are vacuumized or backflushed with modified atmosphere (if required), hermetically sealed to an upper web, separated, and removed for distribution or storage.

Figure 13:
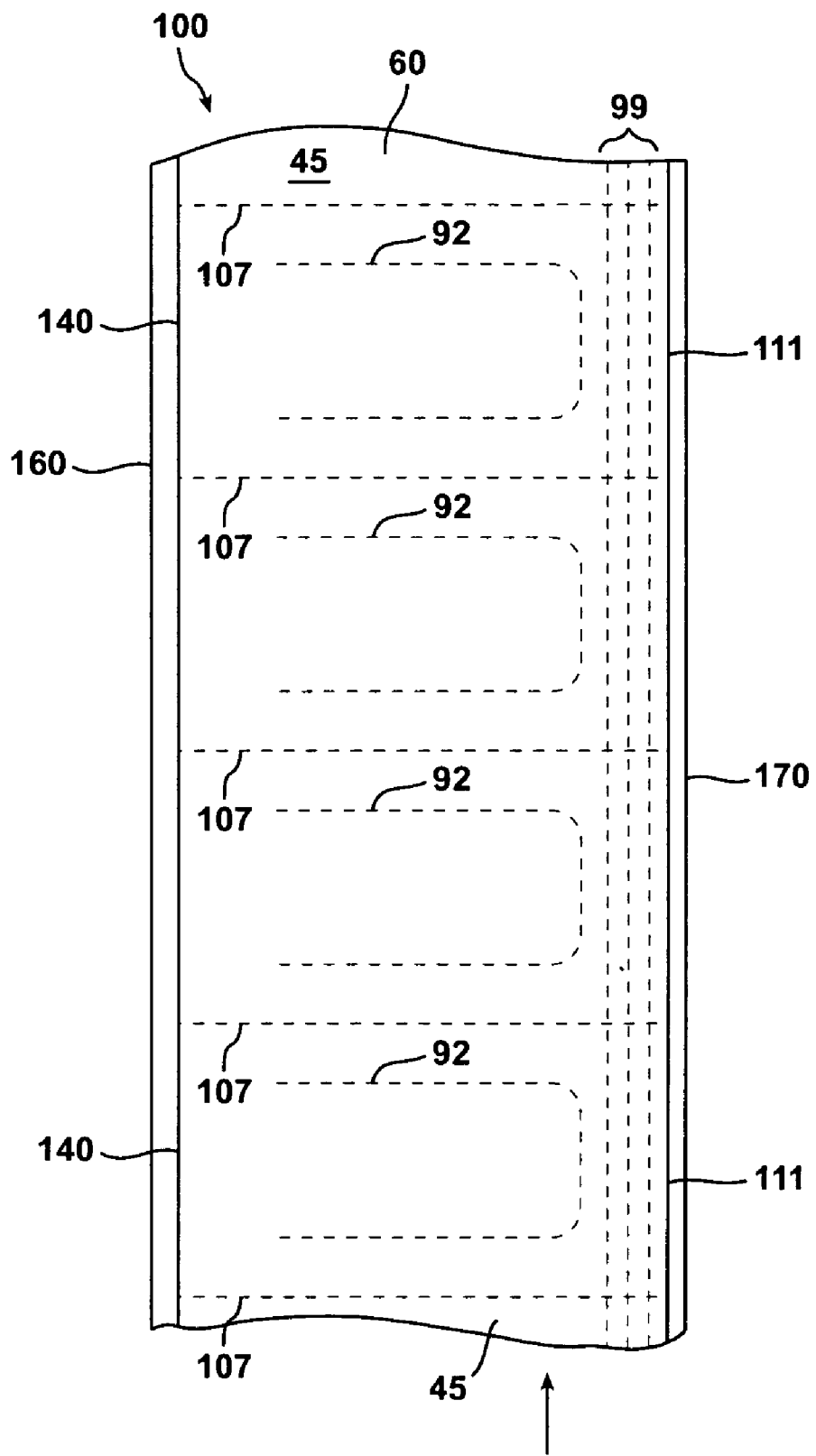
FIG. 13 is a schematic top plan view of the printed laminate of FIG. 9.

FIG. 13 is a top plan view of the laminated lidstock of FIG. 9, viewed through surface 45 of the lidstock.

Figure 14:
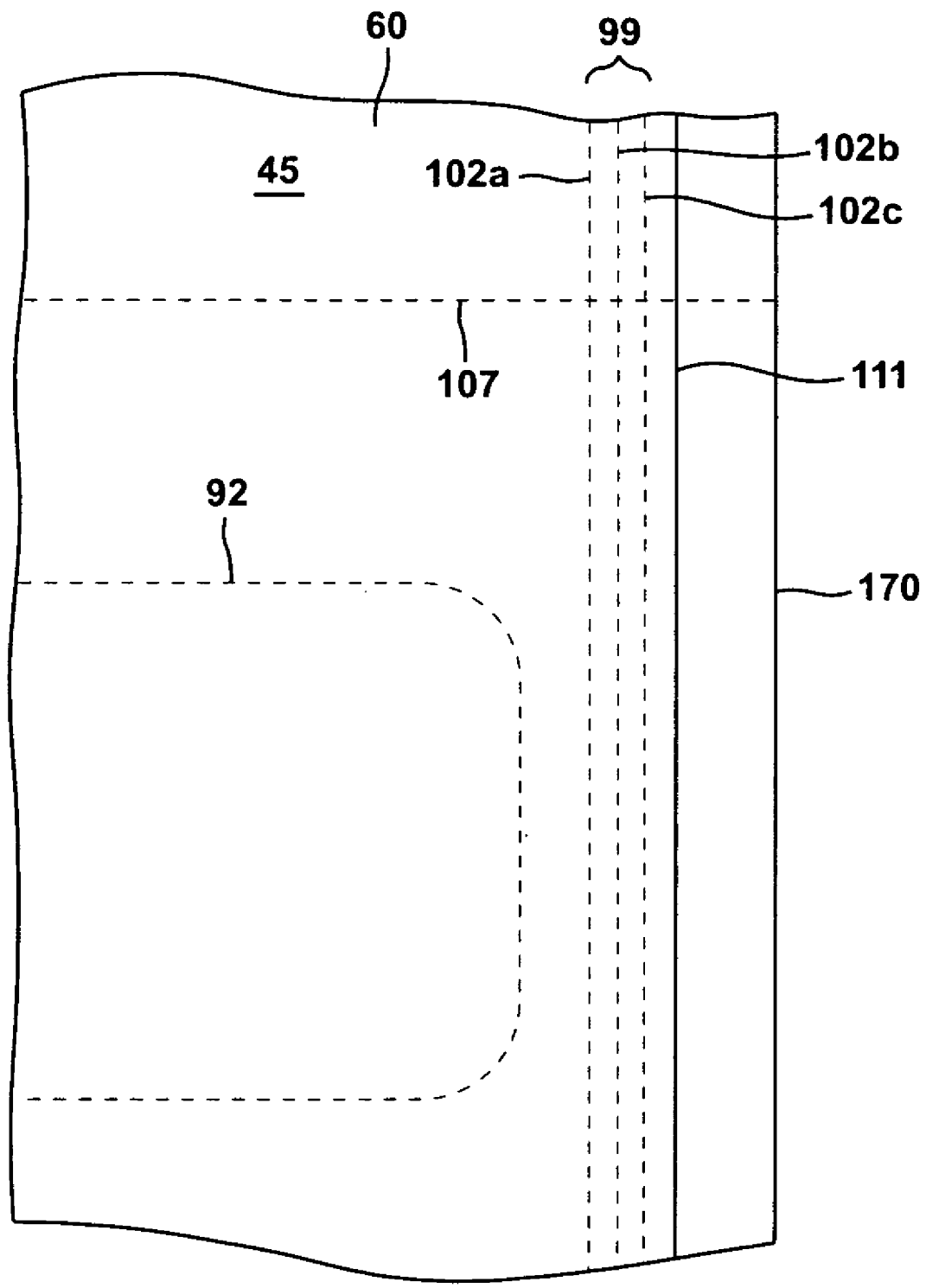
FIG. 14 is an enlarged top plan view of a portion of the printed laminate of FIG. 13.

FIG. 14 shows in enlarged view the end array 99 of opening die cuts 102. This is an end array, i.e. the plurality of die cuts to aid in initial opening of the resulting package are located along and parallel to a first end 111 of the package (see also FIG. 22). This is to be contrasted with another embodiment in which the array is a corner array (see FIGS. 18A and 19). In both embodiments, the heat seal segment 109, forming part of the overall perimeter or total heat seal that holds the laminated lidstock 100 securely and hermetically to the tray 202 in a final package made in accordance with the invention, is disposed amidst, i.e. within the array 99 of opening die cuts 102. The advantage of a plurality of parallel, closely spaced apart die cuts, either near a first end of the package, or near one corner of the package, is that in initially opening the package, a pull tab 106 is created by the placement of the heat seal segment 109. This pull tab 106 is commensurate with the portion of the perimeter of laminated lidstock 100 that is not sealed to the tray flange 208 of tray 202.

In FIG. 18A, this unsealed region is defined by side edge and seal 107, first end and seal 111, and a heat seal segment 109 that traverses in diagonal fashion from the side edge 107 to the first end 111. It will be seen, after considering the discussion herein of FIGS. 12 through 15A, that side edges 107 first end 111, and second end 140 also represent respective portions of the perimeter or total seal of the final package in accordance with the embodiment of FIGS. 18 and 18A. It has been found that, when pulling the laminated lidstock 100 away from the corner of the package, as the material pulls past the die cut 102 most closely upstream of, or overlain by, the heat seal segment 109 (in FIG. 18A, this is die cut 102*c*), the lidstock will begin to delaminate with further opening, thus exposing the PSA. During this delamination, the PSA will typically preferentially adhere to the support web rather than the substrate film, until the product die cut 92 is reached. At that point, the entire laminated lidstock 100 lifts from the surrounding portions of the package in the region of the product die cut 92, to permit access to the contents within the tray cavity 210 of the package 300.

Figure 11:
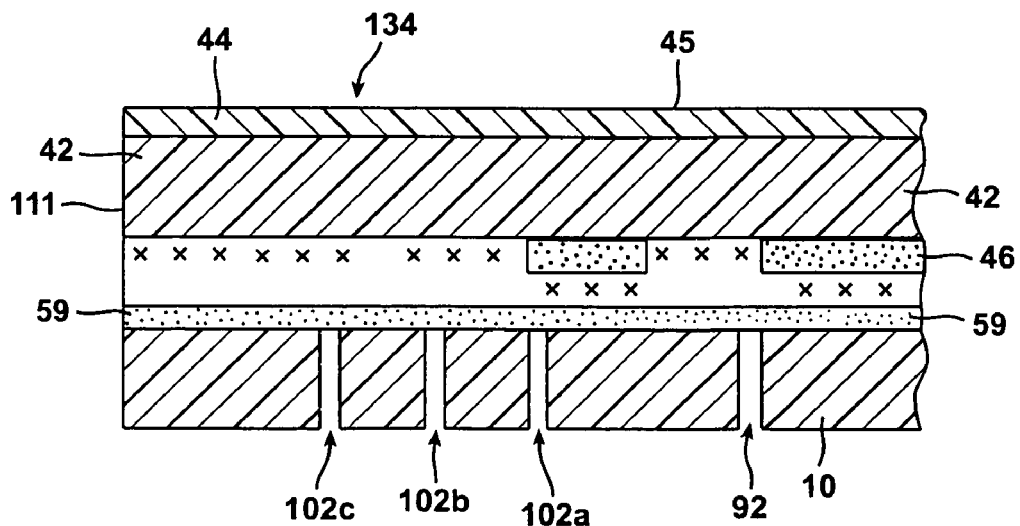
FIG. 11 is an enlarged elevational view of a portion of the printed laminate of FIG. 9.

FIG. 11 is an enlarged elevational view of a portion of the printed laminate of FIG. 9, viewed at arrows X! in FIGS. 18 and 18A, showing the product die cut 92 as well as the opening die cuts 102*a*, 102*b*, and 102*c*.

Figure 22:
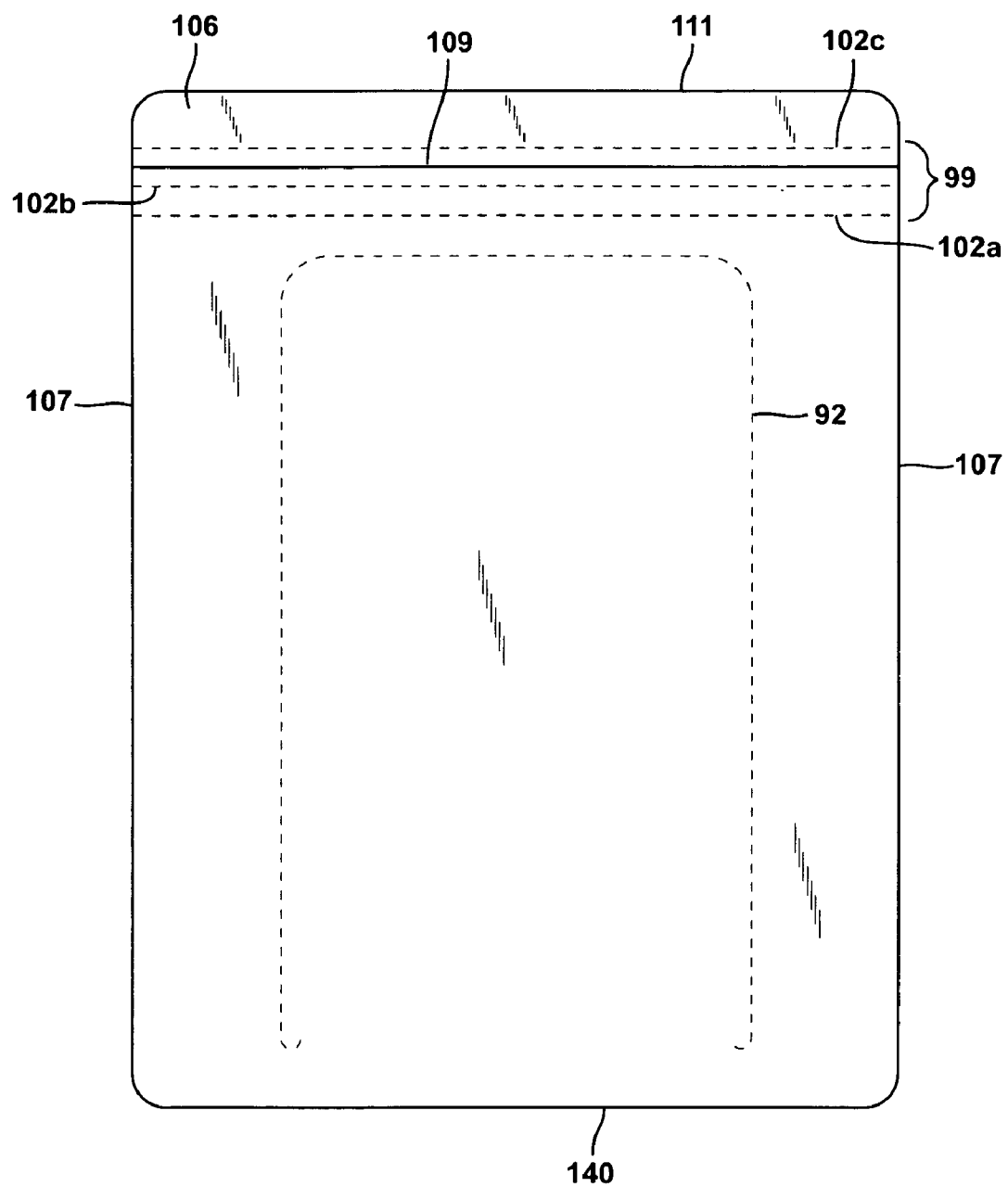
FIG. 22 is a top plan view of the printed laminate of FIG. 9, when sealed to a tray to form a package in accordance with another embodiment of the invention.

In FIG. 22, this unsealed region is defined by side edges and seals 107, first end and seal 111, and a heat seal segment 109 that traverses across the package connecting the two side edges 107, and spaced apart from and parallel to the first end 111. In this embodiment, side edges 107 and second end 140, but not first end 111, also represent respective portions of the perimeter or total seal of the final package in accordance with the embodiment of FIG. 22. When pulling the laminated lidstock 100 away from the first end 111 of the package, as the material pulls past the die cut 102 most closely upstream of, or overlain by, the heat seal segment 109 (in FIG. 22, this is die cut 102*c*), the lidstock will begin to delaminate with further opening, thus exposing the PSA. The opening of the package will then occur in a manner similar to that described above for FIGS. 18 and 18A.

The depictions of die cuts in the drawings are typically exaggerated for purposes of understanding the invention. The actual dimensions of these elements will be typically very small, with little or no material actually removed from the relevant web.

Figure 15:
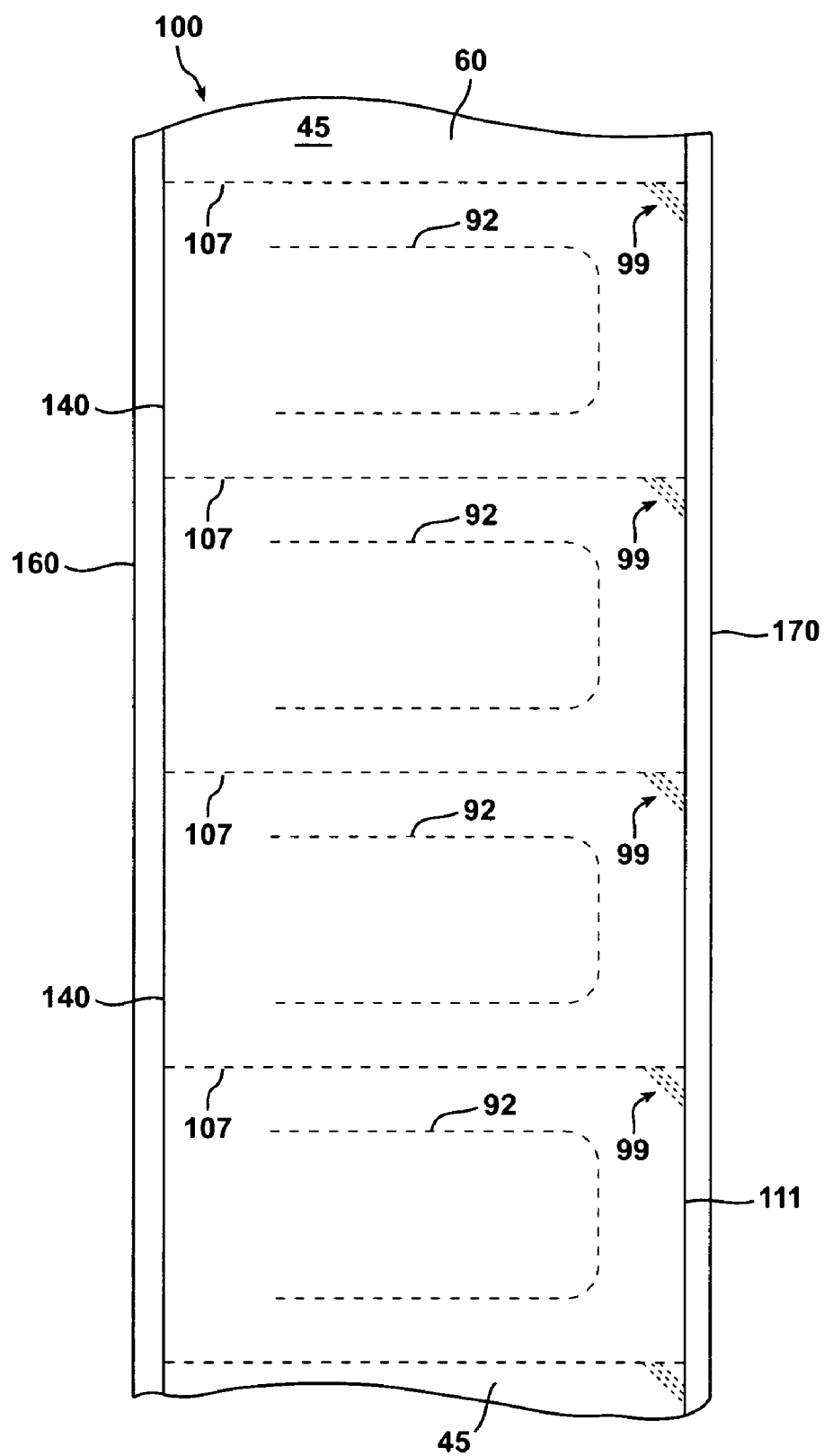
FIG. 15 is a schematic top plan view of an alternative embodiment of the printed laminate of FIG. 9.
Figure 15A:
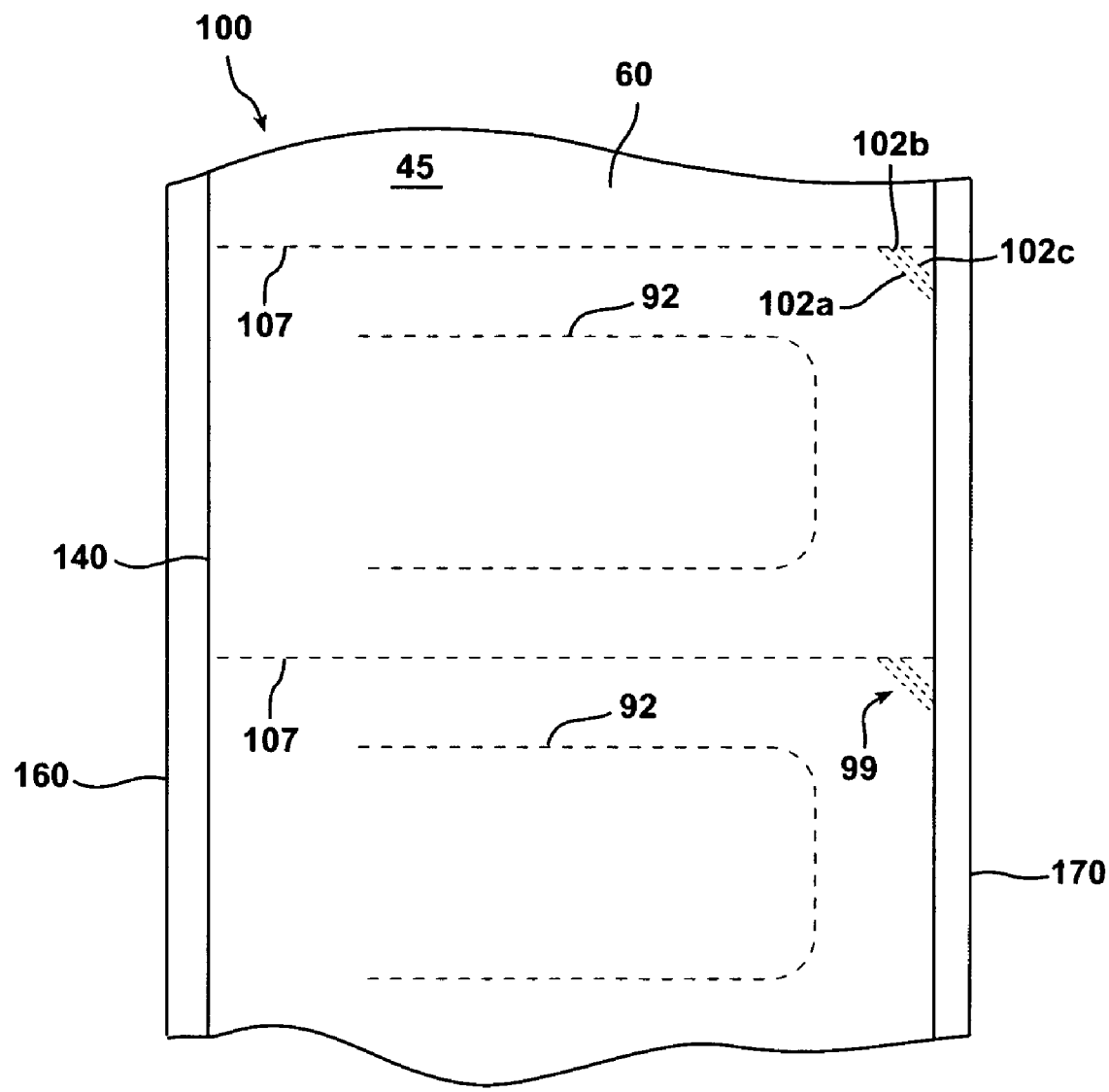
FIG. 15A is an enlarged top plan view of a portion of the printed laminate of FIG. 15.

As shown e.g. in FIGS. 15 and 15A, the array 99 of opening die cuts 102 can in one embodiment be totally linear, and individual cuts 102 will in one embodiment run parallel to and spaced apart from each other.

Figure 16:
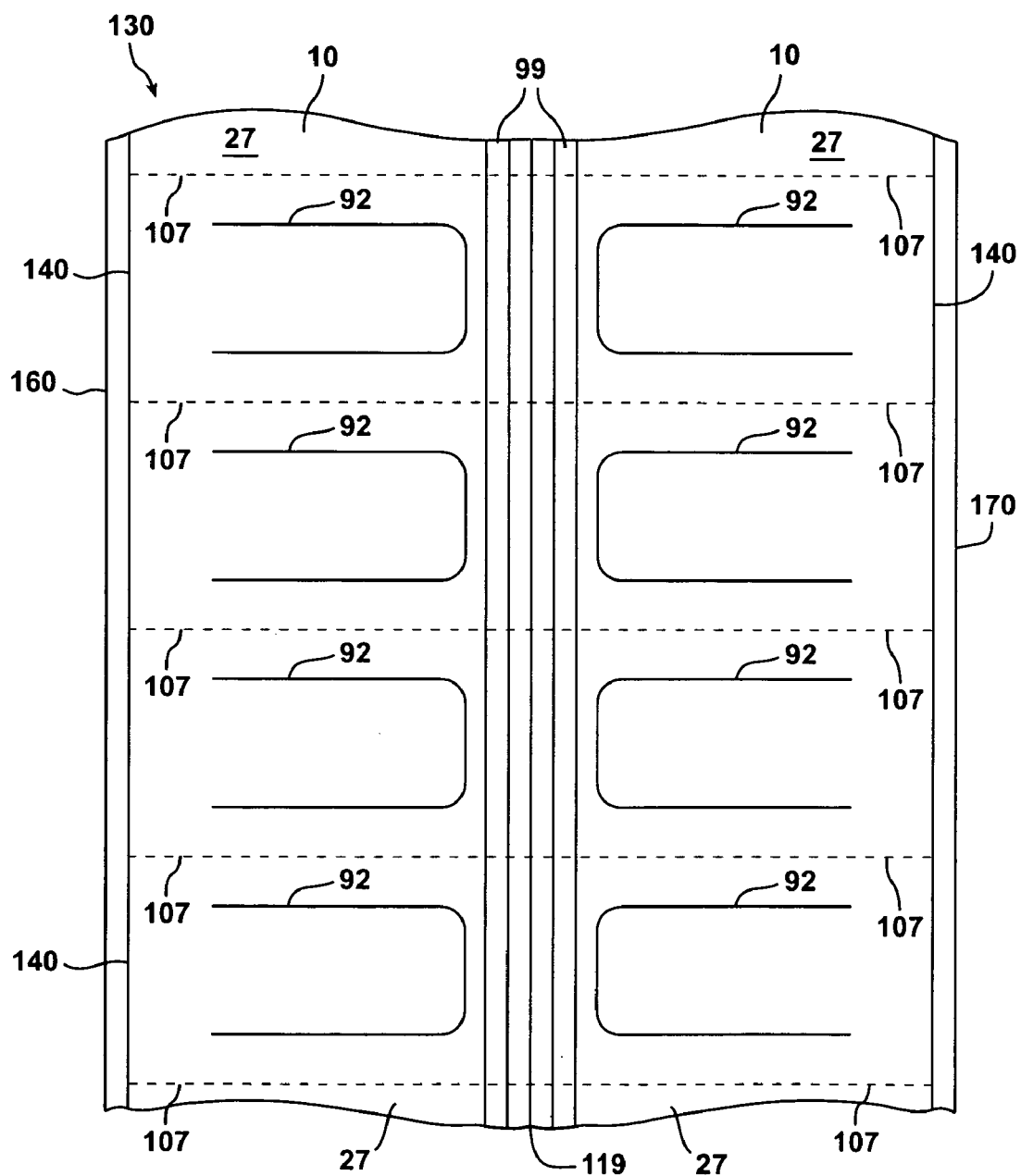
FIG. 16 is a schematic bottom plan view of yet another alternative embodiment of the printed laminate of FIG. 9.
Figure 17:
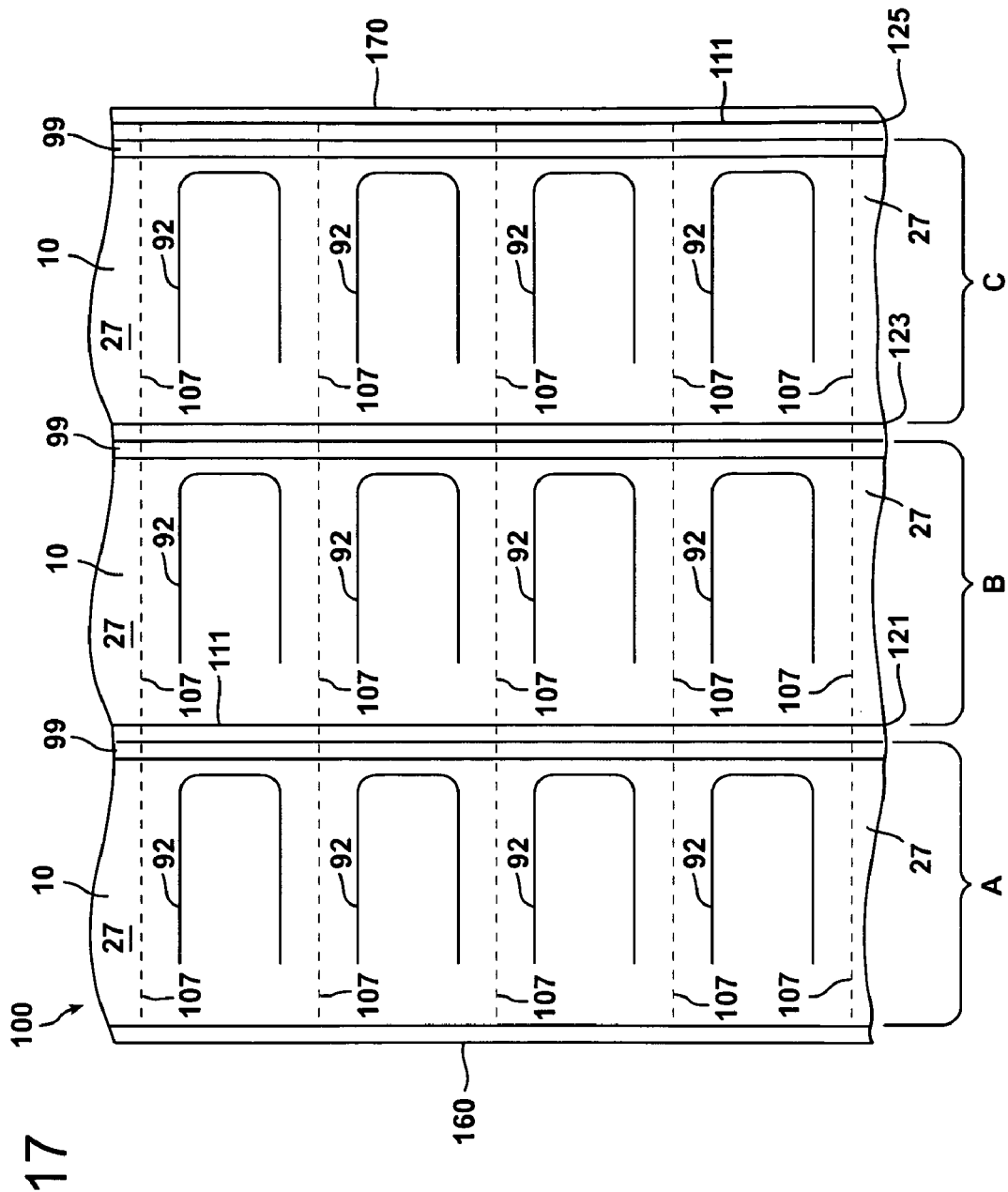
FIG. 17 is a schematic bottom plan view of still another alternative embodiment of the printed laminate of FIG. 9.

FIGS. 16 and 17 show two alternative embodiments of FIG. 12. In FIG. 16, the laminated lidstock is produced as described above, but "two across", so that when run in a packaging machine, with suitable machine die set-ups, two, four, etc. packages can be made simultaneously. In addition to the cut and seal steps at locations 107, the web is cut at center line 119, and this line will mark the first end of the individual packages.

Referring to FIG. 17, in a "three across" format, the laminated lidstock is run on a packaging machine as described above. It will be noted that the die cuts are made (and if printed with decorative print, the printed images are so aligned) so that individual packages made from the longitudinal portion "A" of FIG. 17 will have a first end and seal 121; individual packages made from the longitudinal portion "B" of FIG. 17 will have a first end and seal 123; and individual packages made from the longitudinal portion "C" of FIG. 17 will have a first end and seal 125.

It will be evident from the above discussion that the first end of the laminated lidstock, of each of the substrate film and support web, and of the finished package (lidstock sealed to the tray flange of a filled tray), will be that end that is near to and spaced apart from the array 99 of opening die cuts 102.

3. Package

Figure 21:
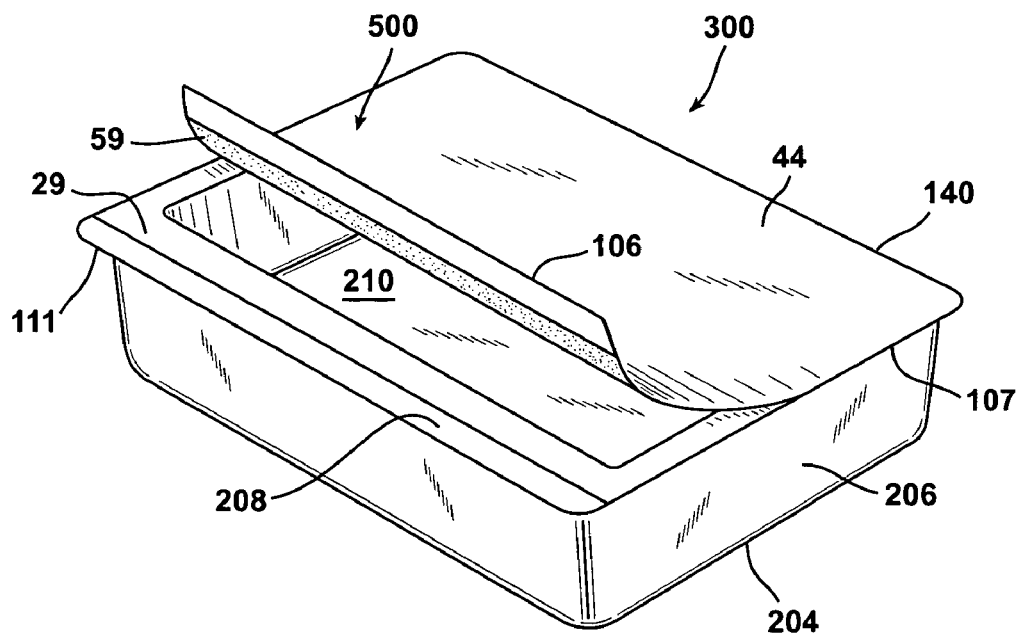
FIG. 21 is a perspective view of a package in accordance with the invention, in a partially opened condition.

Referring to FIG. 21, in one embodiment, an otherwise conventional packaging operation results in package 300. The pull tab 106 is defined when the laminated lidstock is cut and sealed, on packaging equipment, to make individual packages, each with its own lid 500 (see FIG. 21). It will also be noted that if decorative print is disposed in the laminated lidstock, when the laminated lidstock is cut and sealed, on packaging equipment, to make individual packages, each with its own lid 500, the decorative print of the lidstock becomes an integral label for each individual package, eliminating the need for a separate, discrete decorative label.

Figure 20:
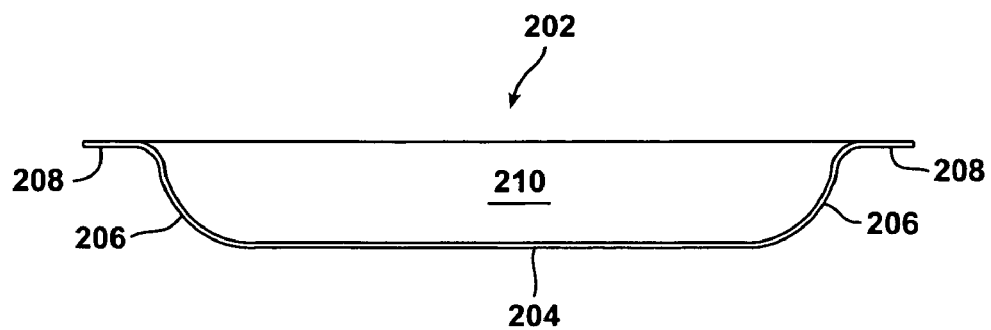
FIG. 20 is a side cross sectional view of a tray in accordance with the invention.

Referring to FIG. 20, tray 202 will typically be made during the food packaging process. Thermoforming equipment, available from e.g. Multivac, is used to convert flat thermoplastic forming web into formed pockets to create trays for containing the food product. Each tray 202 has a tray bottom 204, tray sides 206, and a tray flange 208 along its perimeter to which the printed lidstock laminate can be sealed by heat or other means. The tray bottom 204 and tray sides 206 define a tray cavity 210. Prior to any thermoforming step, tray 202 can be of any suitable thickness, e.g. from 10 and 50 mils thick, and any suitable construction.

If a pre-made tray is used in accordance with the invention, it can be rigid, semi-rigid, or flexible, can be in the form of a flat or shaped tray, and can be made from any suitable material, including solid or expanded embodiments, such as polypropylene, polystyrene, polyamide, 1,4-polymethylpentene (e.g. TPX™ available from Mitsui), or crystallized polyethylene terephthalate (CPET). A tray liner can optionally be used, that adheres to the surface of the pre-made tray on which the food product is to be placed. This liner can be of any suitable design, and can be a multi-layer structure with at least one layer with gas-barrier properties. Such a liner can be adhered to the tray by heat lamination, extrusion lamination, extrusion coating, adhesives, corona treatment, etc.

All ranges disclosed herein are to be understood to encompass any and all sub-ranges subsumed therein. For example, a range of "40 to 80" can include any and all sub-ranges between (and including) the minimum value of 40 and the maximum value of 80, that is, any and all sub-ranges having a minimum value of equal to or greater than 40 and a maximum value of equal to or less than 80, e.g., 40 to 42.

Those skilled in the art will appreciate, after reviewing the disclosure herein, that although the support web is shown as reverse printed, alternatively the outer surface 29 of the substrate film could be printed instead, or in addition. The printability of the particular substrate and support webs used, will be a significant factor in deciding where to install the printed indicia.

The above descriptions are those of embodiments of the invention. All parts and percentages are by weight, unless otherwise indicated or well understood in the art. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. All references to ASTM tests are to the most recent, currently approved, and published version of the ASTM test identified, as of the priority filing date of this application. Each such published ASTM test method is incorporated herein in its entirety by reference.

Terms referring to polymers, such as polyester, polyamide, and polyolefin, refer herein to both homopolymers and copolymers thereof, unless otherwise specified.

What is claimed is:

1. A reclosable package comprising:
   a) a tray comprising a tray bottom, tray sides, and a tray flange, wherein the tray bottom and tray sides define a tray cavity;
   b) a food product disposed in the tray cavity;
   c) a laminated lidstock, hermetically sealed to the tray flange, comprising
      i) a substrate film comprising
         (a) an outer laminating layer comprising a thermoplastic material, the outer laminating layer having an outer surface to which a support web can be adhered with a pressure sensitive adhesive, and
         (b) an inner sealing layer comprising a thermoplastic material, the inner sealing layer having a surface which can be sealed to the tray flange;
      ii) a support web having an outer surface and an inner surface, comprising a thermoplastic material selected from polyester, polyamide, and polyolefin;
      iii) a pressure sensitive adhesive disposed between and adhering the substrate film and the support web, and covering the outer surface of the outer laminating layer of the substrate film and the inner surface of the support web;
      iv) a product die cut disposed in the substrate film, but not substantially present in the support web; and
      v) an array of opening die cuts disposed in the substrate film, but not substantially present in the support web, the array comprising a plurality of opening die cuts parallel to one another, and a heat seal segment, forming part of an overall perimeter seal, disposed within the plurality of opening die cuts; and
   d) a pull tab disposed at one end or corner of the package; wherein the inner sealant layer of the substrate film is sealed to the tray flange.

2. The package of claim 1 wherein at least one of substrate film and the support web comprises an oxygen barrier having an oxygen permeability, of the oxygen barrier, less than 50 $cm^3\ O_2/m^2 \cdot day \cdot atmosphere$ measured at a thickness of 1 mil (ASTM D 3985).

3. The package of claim 2 wherein the support web comprises a coating, adhered to the outer surface of the support web, comprising the oxygen barrier.

4. The package of claim 1 at least one of the product die cut and array of opening die cuts comprises a score.

5. The package of claim 1 wherein printed indicia is disposed on at least one of
   (a) the outer surface of the outer laminating layer of the substrate film, and
   (b) the inner surface of the support web;
such that the printed indicia are disposed between the substrate film and the support web.

6. The package of claim 1 wherein the array of opening die cuts comprises a plurality of parallel die cuts, spaced apart from one another, and positioned parallel to and spaced apart from a first end of the laminated lidstock.

7. The package of claim 1 wherein the array of opening die cuts comprises a plurality of parallel die cuts, spaced apart from one another, positioned in a corner of the laminated lidstock, and at an angle to a first end of the lidstock, and a first side of the lidstock.

* * * * *